United States Patent
Sundaresan et al.

(10) Patent No.: US 9,230,233 B1
(45) Date of Patent: Jan. 5, 2016

(54) SYSTEMS AND METHODS FOR IMPLEMENTING SPECIALTY PACKAGING IN A MATERIALS HANDLING FACILITY

(75) Inventors: Subramanian Sundaresan, Seattle, WA (US); Abhay Murarka, Hyderabad (IN); Sebastian Lehmann, Seattle, WA (US); Rohit K. Gupta, Bellevue, WA (US); Hong Tian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 773 days.

(21) Appl. No.: 13/247,838

(22) Filed: Sep. 28, 2011

(51) Int. Cl.
 *G06Q 10/00* (2012.01)
 *G06Q 10/08* (2012.01)
 *G06Q 50/30* (2012.01)

(52) U.S. Cl.
 CPC .......... *G06Q 10/08345* (2013.01); *G06Q 50/30* (2013.01)

(58) Field of Classification Search
 CPC ... G06Q 10/04; G06Q 10/00; G06Q 10/0833; G06Q 10/08; G06N 5/025
 USPC ........... 705/335, 336, 332; 455/456.1; 706/62
 See application file for complete search history.

(56) References Cited

U.S. PATENT DOCUMENTS

| | | | |
|---|---|---|---|
| 6,615,104 B2 | 9/2003 | England et al. | |
| 6,721,762 B1 * | 4/2004 | Levine et al. | 1/1 |
| 7,212,829 B1 * | 5/2007 | Lau et al. | 455/456.1 |
| 7,769,221 B1 * | 8/2010 | Shakes et al. | 382/141 |
| 7,873,549 B1 | 1/2011 | Mishra et al. | |
| 8,095,395 B2 * | 1/2012 | Cunniff et al. | 705/4 |
| 2003/0200111 A1 * | 10/2003 | Damji | 705/1 |
| 2010/0268659 A1 * | 10/2010 | Zimberoff et al. | 705/336 |

OTHER PUBLICATIONS

Roembke, Jackie, "From the Last Step Forward",Nov. 1, 2007, Wood Digest, High Beam Research, 6 pages.*
Roembke, Jackie, "From the Last Step Forward", Nov. 1, 2007, Wood Digest, High Beam Research, 6 pages.*
U.S. Appl. No. 11/390,430, filed Mar. 27, 2006, Felix F. Antony.
U.S. Appl. No. 11/744,336, filed May 4, 2007, Hong Tian.

* cited by examiner

*Primary Examiner* — Freda A Nelson
(74) *Attorney, Agent, or Firm* — Robert C. Kowert; Meyertons, Hood, Kivlin, Kowert & Goetzel, P.C.

(57) ABSTRACT

The systems described herein may provide mechanisms for recommending specialty packaging in a materials handling facility dependent on physical characteristics of items to be shipped and/or feedback received in response to previous shipments of the items. For example, if feedback indicates frequent low customer ratings for damage during shipping and/or for the suitability of the container in which a particular item was shipped, of if feedback indicates that concession costs were repeatedly incurred due to damage of the item during shipping, the item may be designated as needing special damage protection. This protection may be realized by shipping the item in sturdier containers, in containers of a more suitable size, and/or with improved or increased protective cushioning. For example, a stored indication that an item is designated for special damage protection may influence the selection of a container recommended for shipping the item, e.g., by excluding unsuitable containers from consideration.

27 Claims, 17 Drawing Sheets

SYSTEMS AND METHODS FOR IMPLEMENTING SPECIALTY PACKAGING IN A MATERIALS HANDLING FACILITY

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling. Selecting inappropriate containers in which to package items may increase costs, in terms of container costs, shipping costs, and/or item damage.

A common concern with shipping items and/or groups of items, referred to herein as "item packages," involves ensuring that appropriate containers are used for shipping them, both to minimize costs and to protect the item contents. An agent may select a container based on a visual assessment of the item or items once they are picked from inventory and/or grouped. This visual method of selecting containers may be prone to human error, as an agent may select a container that is too small, that is larger than it needs to be to handle the item or items, or that does not adequately protect the contents of the container. This may result in higher costs associated with using an inappropriate container or in additional costs associated with re-work, in the case that an agent must re-package the item(s) or compensate a customer due to damage during shipping. For example, shipping an item or a group of items in a box that is larger than necessary may result in a higher shipping cost than shipping the same item(s) in a smaller box, due to the cost of the box and/or any higher fees associated with shipping larger or heavier boxes. Similarly, shipping an item or items in a box that is larger than necessary, or not filling each box to capacity, may waste valuable (and expensive) transportation space (e.g., space in a truck or in a shipping container that will be placed on a train or an airplane). In another example, attempting to pack an item in a box that is too large or too small for the item or that does not adequately protect the item may damage the item and/or may result in re-work if the item (or a group of items that include the item) must be taken out of one box and re-packaged in another (larger) box. These excess costs associated with shipping item packages in inappropriate containers may significantly reduce profit margins in some materials handling facilities.

Figure 1:
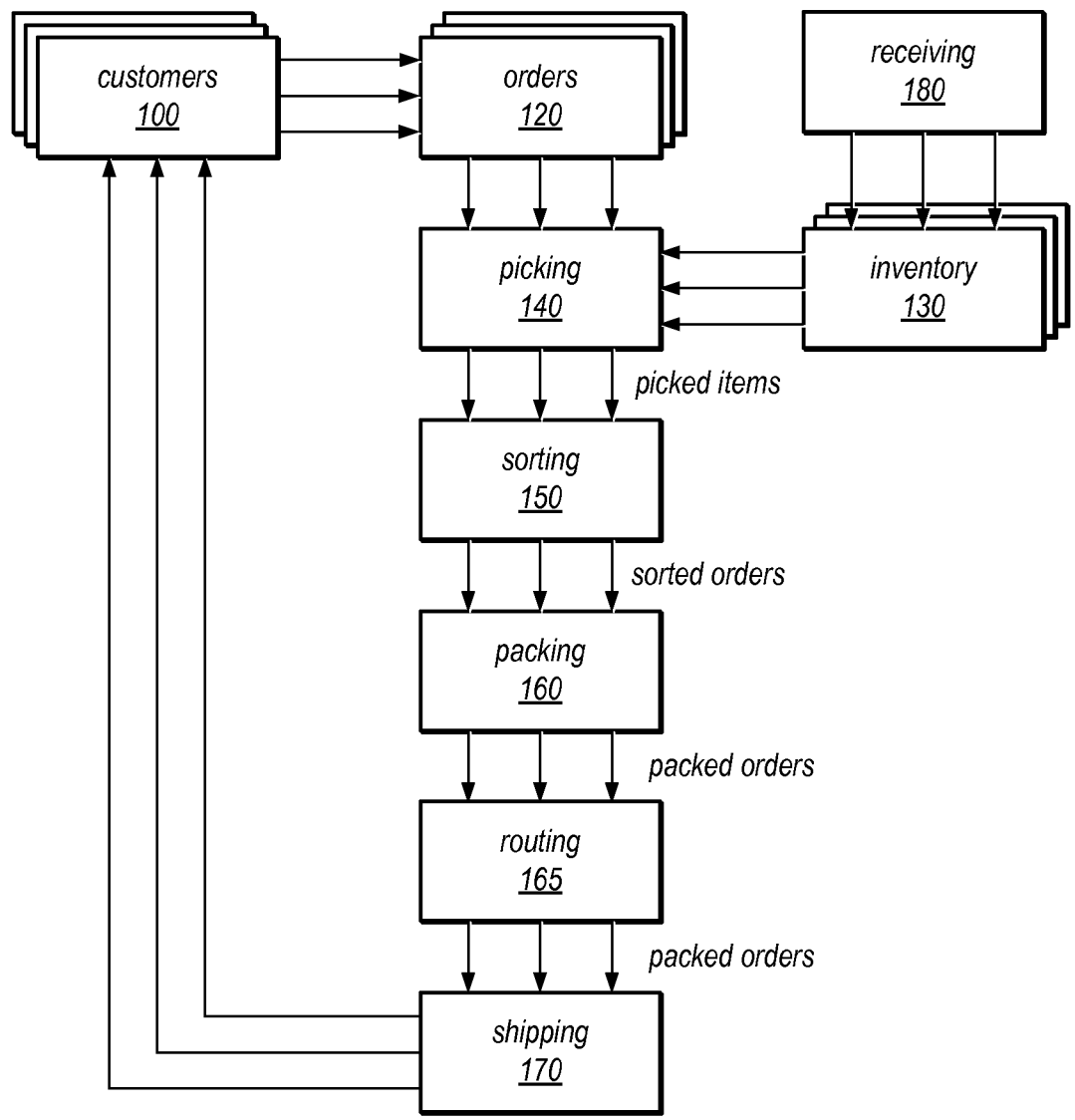
FIG. 1 illustrates a broad view of the operation of a materials handling facility, in one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A packaging information system configured to facilitate stowing, picking, packing and/or shipping operations may include various components used to facilitate efficient and/or cost-effective operations in a materials handling facility. For example, in various embodiments, a packaging information system may include an inventory management system, a product dimension estimator, a product dimension correction manager, a container recommender, a specialty packaging service, a shipping splitting analyzer, and/or a package performance analyzer which may be utilized together or separately to facilitate efficient and/or cost-effective operations in the materials handling facility. For example, one or more of these components may be utilized to recommend a container that is suitable for shipping (or otherwise handling) one or more items in the materials handling facility dependent on physical characteristics and/or delivery related feedback about deliveries of the item(s). In some embodiments, a container recommendation may also be dependent on the customer to whom the item is to be shipped, an applicable service level agreement, the destination of the item, the shipping carrier selected for shipping the item, item affinity information, an indictor of the fragility of the item, and/or an environmental constraint associated with the item (e.g., a restriction on the temperature and/or humidity at which the item should be held during shipping).

In some embodiments, a specialty packaging service may be a scalable service that is configured to route items that are associated with high damage rates to particular process paths (or packing stations thereof) for specialty packaging. The specialty packaging service may also be configured to route item packages with low cube utilization to particular process paths (or packing stations thereof) for specialty packaging. In some embodiments, designating particular items and/or item packages for specialty packaging may result in lower packaging defects and improved customer experiences. In various embodiments, such a specialty packaging service may cause this routing to occur by altering a container recommendation (and/or the behavior of a container recommender) reactively or proactively. For example, a specialty packaging service may be configured to recommend or exclude from consideration certain packaging types based on feedback related to previous deliveries (and more specifically, feedback related to damage during shipping).

In some embodiments, to alter a container recommendation reactively, the specialty packaging service may utilize a feedback loop from any packaging feedback (e.g., customer ratings or other customer feedback) or packaging concessions (e.g., costs incurred due to damage during shipping, lost opportunity costs, and/or customer experience penalty costs) to alter container recommendations provided to packing agents. For example, if ratings associated with the delivery of instances of an item (i.e. an associated with a particular item identifier) in a container of a specific type or size fall below a specified target level for poor ratings, the specialty packaging service may indicate that the specific container type be excluded from consideration by the container recommender, or may otherwise direct or influence the selection of a container for handling instances of the item in future deliveries. In some embodiments, this may include routing the item to a process path configured to provide custom or specialty packaging. In some embodiments, if ratings associated with the delivery of instances of an item in a container of a specific type or size fall below a specified target level for poor ratings, the specialty packaging service may be configured to assign or associate a "customer experience penalty" with that item/container combination, which may be expressed as an additional cost of packaging the item in that container. In some embodiments, the use of a customer experience penalty parameter may serve to discourage the selection of that container (i.e. that item/container combination) in a subsequent shipment that includes the item. For example, item/container combinations for which no negative delivery related feedback has been received may be assigned a customer experience cost of $0, while item/container combinations for which negative delivery related feedback has been received may be assigned a higher customer experience cost (e.g., a fixed penalty of $5 or $10, a penalty based on the cost of the item, or a penalty based on the severity and/or frequency of the negative feedback).

In other embodiments, the specialty packaging service may reactively alter the container recommendation process by incorporating a cube utilization exercise as an input to the process, which may result in an altered container recommendation being provided to packing agents. For example, if the estimated cube utilization for an item or group of items is below a target level, the system may exclude certain container types from consideration, which may cause the item to be routed to a process path configured to provide custom or specialty packaging.

In some embodiments, to alter a container recommendation reactively, the specialty packaging service may utilize known or estimated physical characteristics and/or stored parameter values associated with various items to proactively improve container recommendations. For example, if a parameter values associated with an item (i.e. an associated with a particular item identifier) indicates that the item is fragile or is otherwise in need of special damage protection, the specialty packaging service may exclude containers of certain types and/or sizes from consideration by the container recommender (e.g., mailing envelopes or variable depth folders), and/or may steer the selection (by the container recommender) to containers of other types and/or sizes (e.g., corrugated boxes).

In various embodiments, the specialty packaging service may be configured to provide recommendations for specialty packaging to an automated container recommender, or to packing agents in the materials facility. For example, if special damage protection is needed, the specialty packaging service may also provide an indication to a packing agent that protective packaging materials (e.g., more or better dunnage or fillers, such as bubble wrap or air cushions) should be employed in preparing the item for shipping in the recommended container. In one embodiment, the specialty packaging service may provide one or more of the following indications for an item or group of items: "Is Fragile", "Irregular Shape Type", and "Delivery Country Ship Options."

In some embodiments, if the specialty packaging service provides an indication of "Is Fragile" for an item or group of items, certain package types (e.g., mailing envelopers, variable depth folders, and/or variable depth boxes) may be excluded from consideration by the container recommender, and the packing agent may be reminded to use additional protective cushioning when packing the item(s) for shipping. Similarly, if the specialty packaging service provides an indication of "Irregular Shape Type" for an item, and/or an indication that the shape type for an item is "bottle", "clam shell" or another odd shape, certain package types (e.g., mailing envelopers, variable depth folders, and/or variable depth boxes) may be excluded from consideration by the container recommender to avoid using container types that are not suited for handling such oddly shaped items. If the specialty packaging service provides an indication of "Delivery Country Ship Options" for an item or group of items, certain package types (e.g., variable depth boxes) may be excluded from consideration by the container recommender in favor of a preferred container type (e.g., fixed-size corrugated boxes), and/or the packing agent may be reminded to use additional protective cushioning when packing the item(s) for shipping to far-flung and/or international destinations.

As used herein, the term "item package" may refer to a single item to be shipped (or otherwise handled in a container) alone, or to multiple items that have been grouped for shipping to a customer or for any other operation within a materials handling facility, such as for storing in inventory or transporting to a packing or shipping station. In various embodiments, the term "containers" may refer to pallets, crates, cases, bins, boxes, mailing envelopes or folders, carts, totes, conveyor belts, shelves, cabinets, or any other apparatus capable of handling one or more items for storing, conveying or shipping the item(s). In some embodiments, references to a "container" may refer to any dimensionally-constrained environment, including conventional containers (e.g., boxes, bins, and the like), portals (doorways, hatches, etc.) and dimensionally-constrained paths (chutes, tracks, conveyor belts, etc.)

In some embodiments, a packaging information system (or a container recommender thereof) may be configured to recommend various containers suitable for shipping one or more items or for storing or conveying one or more items in the materials handling facility, dependent on item dimension values currently associated with the items. For example, the system may recommend a particular box type and/or size suitable for shipping a group of items associated with a customer order based on known or estimated dimension values of the items in the group (e.g., item dimension values provided by the vendors of each of the items, measured by agents in the facility, and/or estimated as described herein) and the dimensions of the boxes available for shipping. In one embodiment, the container recommender may base its decision on item dimensions gathered through an automated dimensioning process (e.g., one employing a CubiScan® system), and may have a fairly high level of accuracy. In other embodiments, the item dimensions used in recommending a container may be estimated based on information received from a manufacturer or supplier of the items, or based on a process of successive approximation as the items are handled within the facility.

In some embodiments, the packaging information system (and/or various components thereof) may make particular assumptions about item dimensions or may assign item dimensions according to a standard algorithm, or company policy, in order to facilitate the recommendation of containers for item packages and/or other operations. For example, in one embodiment, the item dimension having the largest value may be designated to be the "height," the dimension having the second largest value may be designated to be the "length," and the dimension having the smallest value may be designated to be the "width" of the item. In such embodiments, the dimensions of containers may also be designated using the same assumptions. In other embodiments, different assumptions or assignments may be made or the designation of length, height, and width dimensions of items or containers may be arbitrary. In some embodiments, standards or policies may specify other aspects of the operations of the materials handling facility, such as a default placement or orientation for certain items within containers or a specific bin-packing algorithm to be assumed when recommending containers and/or estimating the cube utilization of an item or group of items if placed in a particular candidate container. For example, various policies may specify that the largest (and/or heaviest) item in a group should be placed horizontally along the bottom of shipping boxes.

As noted above, known and/or estimated item dimension values may be used to identify containers whose volume and/or dimensions are appropriate for handling one or more items (e.g., to identify candidate containers for storing, conveying or shipping an item or a group of items, or to determine if an item or group of items can pass through a particular portal or be conveyed using a particular dimensionally-constrained path.) In addition, in some embodiments the dimension values and/or volume of the packaging materials and any other non-item contents may also be considered when recommending a container for the item package. For example, the container dimension values and dimension values for promotional inserts and/or fill materials may be supplied to the facility as an input and may be used in determining an appropriate container for collectively handling the items and non-item contents.

In one embodiment, the volume of an item may be defined to be equal to the volume of a three-dimensional bounding box having length, width, and height equal to the length, width, and height of the item, and the volume of a container may be defined to be the maximum volume of the interior of the container. In some embodiments, the volume and dimensions of a group of items may be defined, respectively, to be the volume and corresponding dimensions of a three-dimensional bounding box having sufficient length, width, and height to contain all of the items in the group at the same time. For example, in one embodiment, a container recommendation may be determined using a particular packing algorithm that calculates the volume of such a bounding box according to guidelines and conventions for packing one or more items (e.g., the packing algorithm may specify that the largest and/or heaviest item should be placed horizontally on bottom of the container first and additional items may be placed on top of, or next to, this item in order of their largest dimension value, their weight, etc.) In another embodiment, the system may be configured to calculate a volumetric utilization (e.g., the percentage of the container that would be filled by the item(s) and any non-item contents) for the item(s) when placed in containers of various sizes and shapes. The system may then recommend a container dependent on maximizing the volumetric utilization. While the examples contained herein use the definitions described above, other embodiments may use other definitions of volume and/or volumetric utilization, or may not use a determination of volume or volumetric utilization as part of a container recommendation exercise.

For illustrative purposes, some embodiments of a packaging information system (and/or various components thereof) are discussed below in which particular item and container parameters are analyzed in particular manners, and in which particular types of analyses and processing of parameters is performed. However, those skilled in the art will appreciate that the techniques described may be used in a wide variety of other situations, and that other embodiments are not limited to the details of these example embodiments.

A block diagram of a materials handling facility, which, in one embodiment, may be an order fulfillment facility configured to utilize various systems and methods described herein, is illustrated in FIG. 1. In this example, multiple customers 100 may submit orders 120 to a distributor, where each order 120 specifies one or more items from inventory 130 to be shipped to the customer or to another entity specified in the order. An order fulfillment facility typically includes a receiving operation 180 for receiving shipments of stock from various vendors and storing the received stock in inventory 130. To fulfill the customer orders 120, the one or more items specified in each order may be retrieved or "picked" from inventory 130 (which may also be referred to as stock storage) in the order fulfillment facility, as indicated by block 140. In some embodiments, the items in an order may be divided into multiple item groups (i.e., shipment sets) for shipping by a shipment splitting analyzer before pick lists are generated (not shown).

In this example, picked items may be delivered to one or more stations in the order fulfillment facility for sorting 150 into their respective orders or shipment sets and for packing 160. A package routing operation 165 may sort packed orders for routing to one of two or more shipping operations 170, from which they may be shipped to the customers 100. Package routing operation 165 may in various embodiments be automated or manual. Package routing operation 165 may receive an indication of the destination (e.g., the shipping operation 170) to which each packed order should be routed from a central control system. In some embodiments, a predictive router may determine a routing destination for each packed order dependent on the size of a container that is recommended for shipping the order. The predictive router may provide an indication of the predictive routing destination to the central control system, and/or directly to the package routing operation 165, so that the packed order may be diverted to an appropriate shipping operation 170, as described herein. In other embodiments, a routing operation may route picked or sorted items to a particular packing operation 160, dependent on an indication that a container (e.g., a box or mailer) of a particular type and/or size has been recommended for shipping the item or items (not shown). For example, not all container types or sizes utilized in the facility may be available at all of the packing stations 160. Similarly, some packing stations 160 may not have access to protective materials recommended for shipping fragile items or items for which feedback indicates additional protection may be appropriate. Therefore, if an item (or at least one item in a group of items to be shipped together) requires special packaging, a router operation may be configured to direct the item(s) to a packing station 160 at which an appropriate container and/or protective materials are available. In another example, if a custom container is recommended for shipping an item (or a group of items), the item(s) may be routing to a packing station 160 at which a custom container can be assembled for the item(s).

Note that not every fulfillment facility may include both sorting and packing stations. In certain embodiments agents may transfer picked items directly to a packing station, such as packing station 160, while in other embodiments, agents may transfer picked items to a combination sorting and packing station (not illustrated). This may result in a stream and/or batches of picked items for multiple incomplete or complete orders being delivered to sorting 150 for sorting into their respective orders for packing 160 and shipping 170, according to one embodiment. This may result in a stream and/or batches of picked items for multiple incomplete or complete orders being delivered to sorting 150 for sorting into their respective orders or shipment sets for packing 160, routing 165, and shipping 170, according to one embodiment.

Note that portions of an order may be received at different times, so sorting 150 and packing 160 may have to wait for one or more items for some orders to be delivered to the sorting station(s) before completion of processing of the orders. Note that a picked, packed and shipped order does not necessarily include all of the items ordered by the customer; a shipped order may include only a subset of the ordered items available to ship at one time from one inventory-storing location. Also note that the various operations of an order fulfillment facility may be located in one building or facility, or alternatively may be spread or subdivided across two or more buildings or facilities. In various embodiments, items and groups of items may be transported between the stations or operations of the facility in one or more containers, through one or more portals, and/or using one or more dimensionally-constrained paths (e.g., chutes, pneumatic tubes, or conveyor belts), as described herein.

Automated container recommendation (which may include specialty packaging recommendation), as described herein in various embodiments, may be utilized in a number of different facilities and situations, including, but not limited to materials handling facilities, order fulfillment centers, rental centers, distribution centers, packaging facilities, shipping facilities, libraries, museums, warehouse storage facilities, and the like. Note that the arrangement and order of operations illustrated by FIG. 1 is merely one example of many possible embodiments of the operation of an order fulfillment facility utilizing automated container recommendation. Other types of materials handling, manufacturing, or order fulfillment facilities may include different, fewer, or additional operations and resources, according to different embodiments.

A system configured to implement automated container recommendation (which may be a component of a comprehensive packaging information system) may, in some embodiments, be configured to instruct or recommend the selection, from among available containers, of a container in which to place one or more items, or a portal or path through which to convey the items, during the receiving 180, storing in inventory 130, picking 140, sorting 150, packing 160, or shipping 170 operations described above. In some embodiments, the selection of containers that are neither too small nor larger than they need to be may result in more efficient use of space in the facility for storage and other operations, and may also reduce costs associated with floor space, packing materials, or transportation (e.g., shipping). In some embodiments, the system may be configured to estimate the dimensions of a container suitable for storing, transporting, or shipping the items that is space-efficient and/or cost effective. In some embodiments, the system may be configured to determine if an item or group of items will fit in a given inventory area, will fit through a given portal, such as a doorway, hatch, or gate, or can be transported using a given dimensionally-constrained path, such as a chute, track, pipe, or conveyor belt. In other embodiments, the system may be used to facilitate item picking, such as by directing an agent to select a given item from a particular inventory area based on the relative values of actual (e.g., corrected) dimension values of the items in the inventory area.

In some embodiments, a materials handling facility may store different instances of items in different individual inventory areas within inventory 130. Additionally, different items may be stored together in a single inventory area, according to particular embodiments. In some cases, storing different items together may result in more efficient use of total inventory space than using a single inventory area for multiple copies of a single item or product. In other cases it may be beneficial to store similar items together to make better use of inventory space. In some embodiments, such as that illustrated in FIG. 2, an inventory area may include both similar items stored together, such as on one shelf, and different items stored together, such as on another shelf. In this example, storing different compact discs (CDs) together on a single inventory shelf, as shown in inventory area 235b, may use the available inventory space more efficiently than storing one CD among other items of greatly differing size and shape, such electronic devices, clothing, or other items. In some embodiments, a materials handling facility may also store items of similar, but not identical, shape and size together in a single inventory area. For instance, in one embodiment, items such as books, CDs, and digital video discs (DVDs) may all be stored together, as shown in inventory area 235a. In still other embodiments, different items, with different shapes and sizes, may all be stored together. For example, inventory area 235e illustrates clothing and electronic items stored along with books, CDs, etc.

In some embodiments, determining where to store an item may be performed manually, while in other embodiments, it may be an automatic process performed by one or more computer software programs based on the dimensions of the items. In some embodiments, both space utilization and speed of storing may be improved if an agent is directed to store an item in an inventory area, such as a shelf or bin, in which it will easily fit. In some such embodiments, selecting an appropriate inventory area may also reduce damage during the storing operation if items are not forced into shelves or bins that are too small. In some such embodiments, an inventory management system may consider the dimensions of an item that needs to be stored, the dimensions of currently stored items, and the dimensions of inventory areas in which items are currently stored when identifying an inventory area with enough remaining free space to hold the item. For example, if a book is to be stored in one of the inventory areas illustrated in FIG. 2, the inventory management system may use the dimensions of the book to determine that it is too wide to fit in any remaining spaces of inventory areas 235a, 235b, 235c and 235e, based on the dimensions of the other items stored in those areas. In this example, the inventory management system may determine that the book should easily fit in inventory area 235d and may direct an agent to store it in this area. In some embodiments, if the item does not fit in the area recommended by the inventory management system, the inventory management system may be configured to correct one or more item dimension values currently associated with the item, such as values maintained in a table, database, or other data structure comprising item parameters.

Similarly, for operations other than storing, selecting an appropriate container in which to place one or more items may also increase space utilization and/or reduce damage and costs. For example, selecting an appropriate portal or dimensionally-constrained path through which to convey an item may reduce damage caused by trying to fit an item through a portal that is too small or by trying to place an item in a chute that is too narrow for the item. In another example, being able to accurately determine the size of totes needed for picking groups of items and being able to pack these totes to near capacity, based on having accurate dimension values for the items in the group, may reduce the number of such totes needed, thereby reducing costs.

Figure 2:
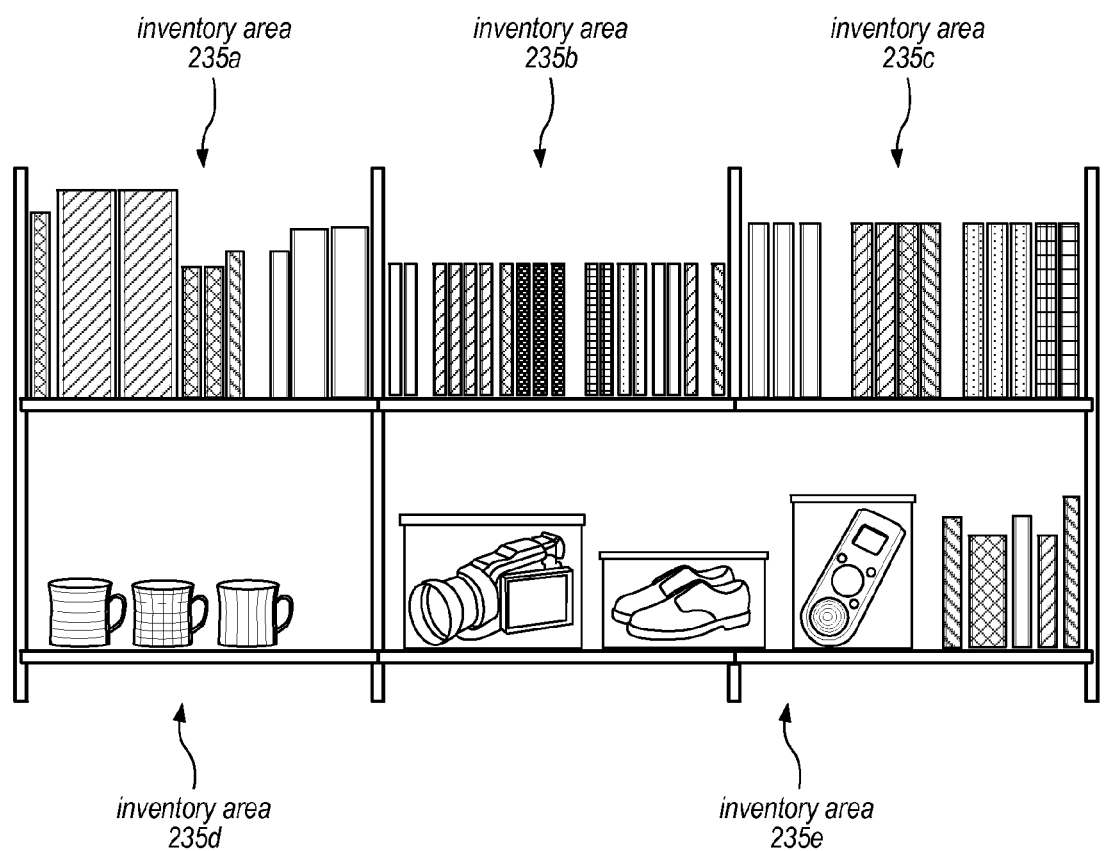
FIG. 2 illustrates various items stored in a multi-shelf inventory area of a materials handling facility, according to one embodiment.

The items in a materials handling facility may be of varying shapes and sizes, as shown in the example inventory areas illustrated in FIG. 2. In this example, some items in the materials handling facility are irregularly shaped. In some embodiments, irregularly shaped items may be stored in boxes or other regularly shaped packaging, which may facilitate container recommendation, and/or more efficient storage, such as by making stacking of such items possible. This is illustrated in inventory area 235e. In other embodiments, irregularly shaped items may be stored without placing them in regularly shaped packaging. This is illustrated in inventory area 235d. According to various embodiments, automated product dimension estimation and/or correction may be utilized with any regularly shaped or irregularly shaped items.

An automated container recommender may, in some embodiments, be used to recommend a container, portal, or path suitable for storing or transporting one or more items dependent on their known or estimated dimensions. For example, in some embodiments, the container recommender may receive information identifying two or more items to be placed in a container, may retrieve one or more dimensions of each of the items, and may recommend a container into which the items may be placed dependent on the retrieved dimensions. In one embodiment, recommending a container into which the item or items may be placed may involve selecting the smallest available container into which the item(s) will fit from among a plurality of available containers. In another embodiment, recommending a container into which the item or items may be placed may involve estimating the total dimensions of the group of items dependent on the estimated dimensions of each of the items and selecting a container having dimensions greater than or equal to the estimated total dimensions. In some embodiments, a product dimension estimator may determine if an item or group of items may be passed through a particular portal or conveyed using a particular path. In many cases, knowing the exact dimensions of an item may not be necessary for determining a container into which a group of items can be placed, since the "practical" or estimated dimensions of the items may provide a size envelope accurate enough to select a container from among a finite set of container types and sizes.

After automatically identifying item parameter values, the product dimension learning estimator (or another component of the packaging information system, such as a container recommender) may use those values to estimate corresponding parameter values (e.g., dimensions) of various containers, portals, or paths suitable for storing or conveying one or more items in the materials handling facility or for shipping one or more items. In some embodiments, an automatic product dimension estimator or container recommender may be configured to recommend a container, portal, or path suitable for storing or conveying one or more items in the materials handling facility or for shipping one or more items, such as in response to a customer order. For example, the estimator or recommender may recommend a particular box type and/or size suitable for shipping a group of items associated with a customer order based on the estimated dimensions of each of the items in the group and the dimensions of the boxes available for shipping. In another example, the estimator or recommender may recommend a particular shelf on which to store a book based on the estimated dimensions of the book, the dimensions of one or more available shelves, and the estimated dimensions of any other items already located on the available shelves.

In some embodiments, a comprehensive packaging information system may include a container recommender, which may be configured to recommend a container in which to handle an item package that includes one or more items. The container recommender may be configured to recommend a smallest container in which the item package (including the one or more items and/or any non-item contents) may be transported within a materials handling facility or in which the item package may be shipped, or may be configured to recommend two or more container options, each of which is suitable for transporting the item package, in different embodiments. The recommendation may be generated by, or received by, a module of a comprehensive packaging information system, as described herein, which may be implemented in any combination of hardware and/or software within the materials handling facility, in various embodiments. In other embodiments, the recommendation may be received from a remote system that is configured to exchange information with the operations of the materials handling facility. For example, a comprehensive packaging information system may be implemented as a software application executing on a computing system outside the materials handling facility and configured to implement recommending a container for an item package. The comprehensive packaging information system may be configured to receive inputs from other software applications, agents working in the facility or remotely, and/or automated systems within the facility (e.g., scanners, sensors, automated storing, picking, or packing equipment, or software applications managing one or more local or remote data stores). In another example, the recommendation may be received from a separate mechanism, such as a container recommender implemented in a combination of hardware and software executing on the same or a different computing system than a comprehensive packaging information system within the materials handling facility or remotely.

An automated container recommender may be configured to recommend a container, portal, or path for handling the item package based on the currently stored volume and/or dimensions of each of the items included in the item package. In some embodiments, the automated container recommender may calculate the overall dimensions of the item package based on the item dimensions of each of the items as well as dimensions of any required non-item contents (if any). In such cases, the container recommender may be configured to recommend a smallest available container in which the grouped items will fit, a portal through which they may pass, or a dimensionally-constrained path on which they may be conveyed based on the calculated overall dimensions. In other embodiments, the container recommender may use a standard or custom bin-packing algorithm to determine, for each available container, whether or not the items will fit in the container. In some embodiments, the container recommender may begin its recommendation process by determining if the items will fit in the smallest available container, or through the smallest portal or path, and if not, repeating its determination for each other container, portal, or path in turn, from smallest to largest, until determining that the items will fit into one of the containers or through one of the portals or paths. In other embodiments, the identification of suitable containers, portals, or paths for handling the package may be performed in other manners. For example, the container recommender may track container, portal, or path types corresponding to those handling various groups of item contents, and may retrieve an indication of one or more appropriate container, portal, or path types for handling the current item contents based on a stored mapping for those contents.

Recommending a container, portal, or path may include displaying an indicator of the container, portal, or path to be used on an input/output device readable by an agent working in the materials handling facility, in some embodiments. In other embodiments, a recommendation for a container, portal, or path may be printed for an agent, such as on a pick list or packing list. In still other embodiments, a machine may be configured to pick and/or present a container (such as a box) to an agent or to an automated packing system based on the recommendation or to automatically transport the items to a portal, path, or packing station (e.g., one handling item packages having a particular range of items dimensions) for further handling. Therefore, receiving a recommendation for a container may include being presented with a printed or displayed recommendation, being presented with a recommended container, or receiving an indication that an item package has been routed to a particular portal, path, or packing station, in different embodiments.

In some embodiments, item dimensions (e.g., known item dimensions or estimated item dimensions determined by an automated product dimension estimator) may be used to recommend suitable containers, portals, or paths which may be used in storing or conveying one or more products within a materials handling facility or in which to ship one or more products to a customer. In some embodiments, additional information may be used to exclude the selection of containers that are unsuitable for handling items needing special damage protection. One such embodiment is illustrated in the flow diagram in FIG. 3. In this example, the method may include receiving an indication of an item or group of items to be stored, conveyed, shipped, or otherwise handled in a container, as in 300. In various embodiments, this indication may take the form of a stow list, pick list, inventory list, order, packing list, etc., and may be a physical list, such as a printed list, or may be a virtual list, such as may be contained in a memory accessed directly by an automated container recommender, or such as may be displayed on a monitor, handheld device, or other suitable display mechanism. In some embodiments, such a list may be scanned automatically or by an agent in the materials handling facility to serve as an input to the automated container recommender.

Once the item or items to be handled are known, the automated container recommender may retrieve any estimated or known values of the dimensions (and/or volumes) of the item(s), as shown in 310. In some embodiments, estimated or known dimensions and/or volumes of various items may be retrieved from a table or database, such as Table 1, described below.

In some embodiments, an automated container recommender may be configured to determine one or more recommended options for a container, portal, or path for handling the group of items based on the estimated volume and/or dimensions of each of the items, as in 320. In some embodiments, the automated container recommender may calculate overall dimensions of the item(s) as well as dimensions of any required non-item contents (if any). In such cases, the container recommender may recommend the smallest available container(s) in which the item(s) will fit, the portals through which they may pass, or the dimensionally-constrained paths on which they may be conveyed based on the overall dimensions of the item(s). In other embodiments, the container recommender may use a standard or custom bin-packing algorithm to determine, for each available container, whether or not the item(s) will fit in the container. In some embodiments, the container recommender may start by determining if the items will fit in the smallest available container, or through the smallest portal or path, and if not, repeating its determination for each other container, portal, or path in turn, from smallest to largest, to determine whether the items will fit into one or more of the containers or through one or more of the portals or paths. In other embodiments, the identification of suitable containers, portals, or paths for handling the item(s) may be performed in other manners. For example, the container recommender may track container, portal, or path types corresponding to those handling various groups of item contents, and if so, may retrieve an indication of one or more appropriate container, portal, or path types for handling the current item(s) based on a stored mapping for those contents.

Figure 3:
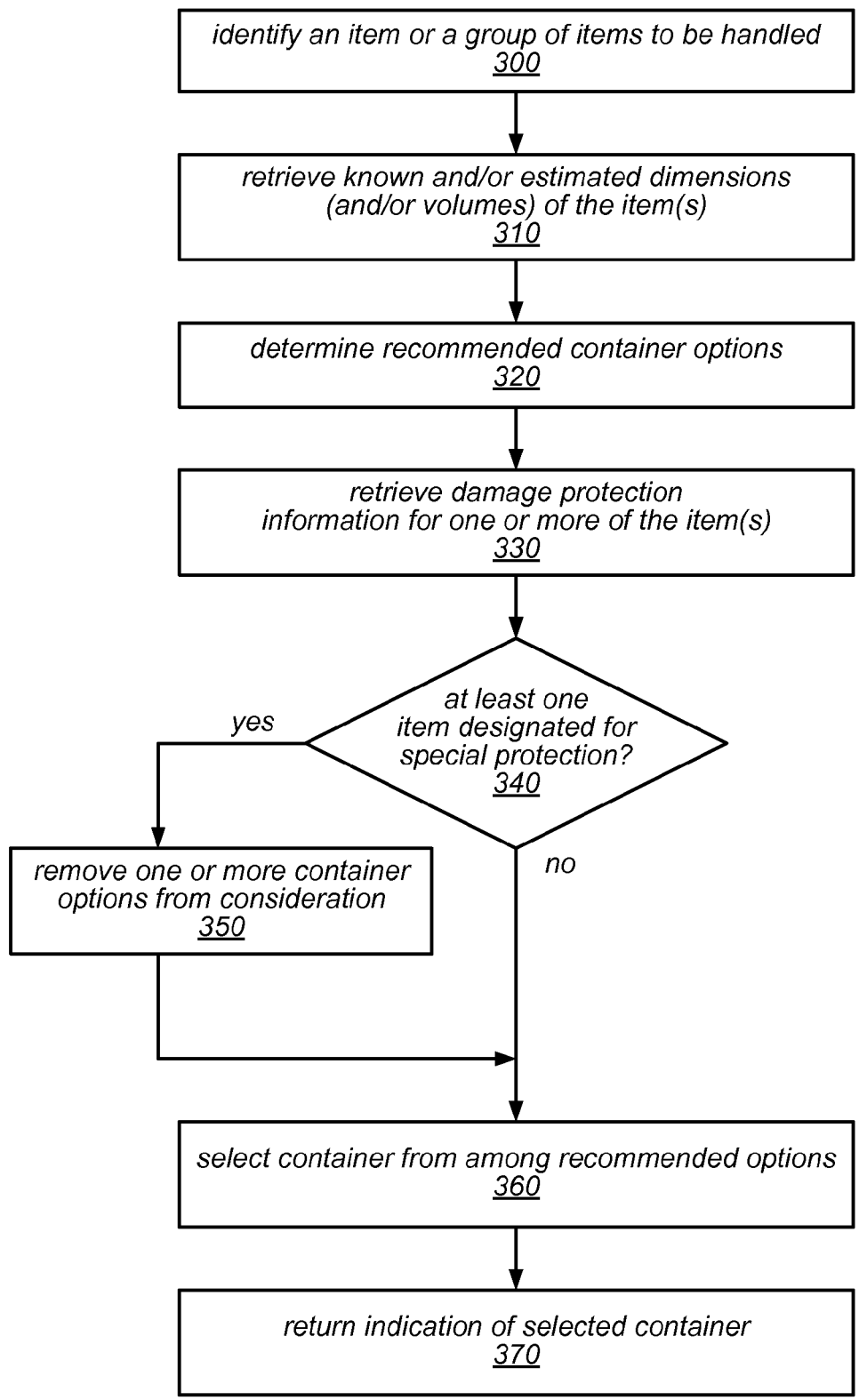
FIG. 3 is a flow diagram illustrating a method for recommending a container for handling one or more items, and for excluding some container options from consideration, according to one embodiment.

As illustrated in the example in FIG. 3, once one or more recommended container options have been determined, the method may include retrieving damage protection information for one or more of the items, as in 330. For example, the container recommender may access one or more databases that store information about the items stored in the materials handling facility. In one embodiment, information associated with each item identifier may include a flag or parameter value indicated whether or not the item is designated as one for which special protection is recommended or required. In another embodiment, a database may store a list of the identifiers of items that have been designated for special protection. If at least one item of the item(s) to be handled is designated for special protection, shown as the positive exit from 340, the method may include removing one or more of the recommended container options from consideration, as in 350. In other words, the method may include the container recommender removing from consideration any containers that are unsuitable for handling items that need special (or at least better) protection from damage during shipping. For example, if a plate to be shipped has been designated as needing special damage protection, all mailing envelopes may be excluded from consideration, even those whose sizes indicate that they may be suitable for shipping the plate.

Once one or more unsuitable container options have been removed from consideration (or if no options are removed from consideration because no items are designated for special protection), the method may include selecting a container from among the recommended options, as in 360. In other words, a recommended container may be selected from among the options determined at 320, or from a pared down version of that list of options (e.g., pared down as in 350). The container recommender may then return an indication of the selected container (e.g., the container ultimately recommended for use), as in 370.

In various embodiments, there may be different methods for determining when and if to designate an item as one for which special damage protection is recommended or required. In some embodiments, these methods may take into consideration customer feedback and/or data indicating whether concessions (e.g., monetary concessions) have been made due to item damage when determining whether to designate an item as one needing special protection. For example, a specialty packaging service may include a rules engine that applies a variety of policies to determine when and if to designate an item as needing special damage protection. Some of those rules may be applicable to specific customers (or to customers having specific service level agreements), specific product types or product lines, items from specific vendors, specific materials handling facilities, items to be shipped to specific destinations (e.g., to particular international destinations and/or to destinations at a great distance from the facility), items to be shipped using specific carriers (e.g., carriers having a history of damaging items at an above average or below average rate), or other subsets of the items being shipped from the facility.

Figure 4:
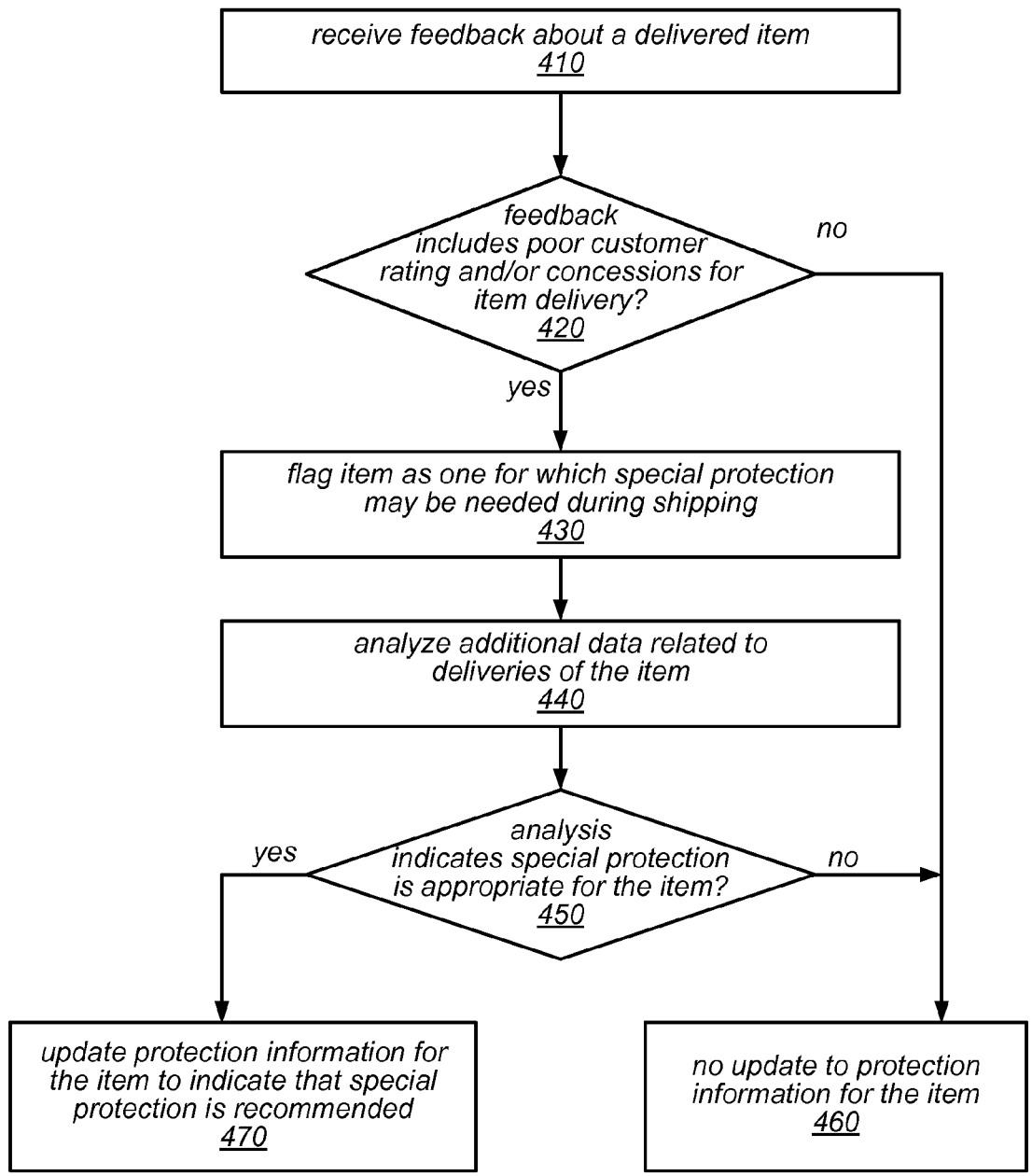
FIG. 4 is a flow diagram illustrating a method for determining whether to designate an item to receive special damage protection, dependent on delivery related feedback, according to one embodiment.

One embodiment of a method for making such a determination is illustrated by the flow diagram in FIG. 4. In this example, an automated container recommender (or a specialty packaging module thereof) may receive feedback about a delivered item, as in 410. For example, the feedback may include a rating of the condition of the delivered item (e.g., a rating indicating whether, or to what degree, the item was damaged during shipping), and/or a rating of the appropriateness of the container in which the item was shipped (e.g., a rating indicating whether the size or type of container was appropriate for shipping the item). For example, each of these categories may be given a rating between one star (for the worst condition) and five stars (for the best condition) or a rating based on description (e.g., about right, a little too large, way too large, a little too small, way too small). If the feedback includes a poor customer rating for item delivery and/or the feedback indicates that concessions have been made related to the delivery of the item, shown as the positive exit from 420, the method may include flagging the item as one for which special protection may be needed during shipping, as in 430. For example, if a refund, credit, and/or replacement item was provided following the delivery of the item and/or other costs were incurred as a result of damage during shipping of the item (e.g., re-work or re-stocking costs), this may trigger the flagging of the item for possible designation as an item that needs special damage protection.

Figure 7:
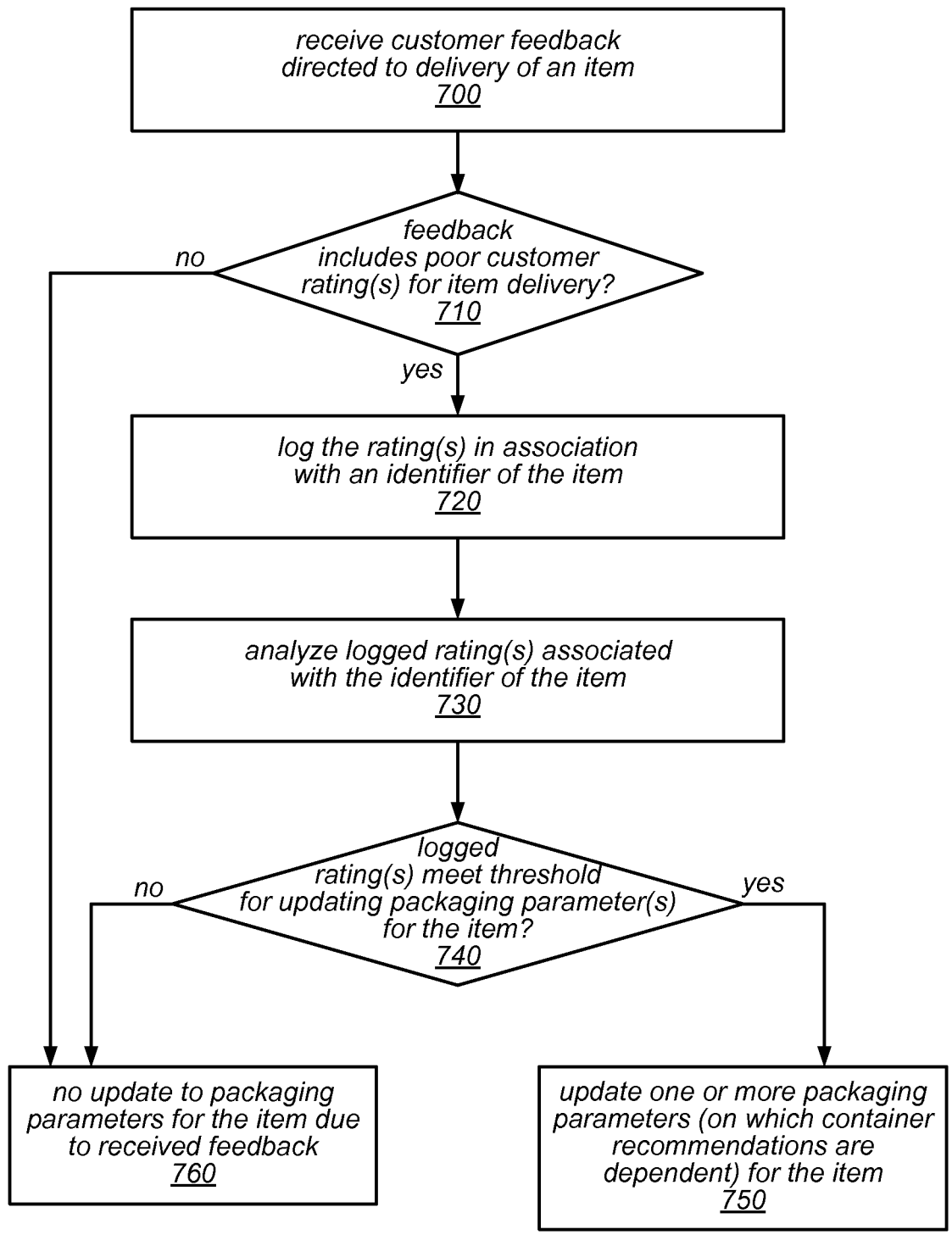
FIG. 7 is a flow diagram illustrating one embodiment of a method for incorporating customer feedback when determining recommended container options for handling one or more items.
Figure 8:
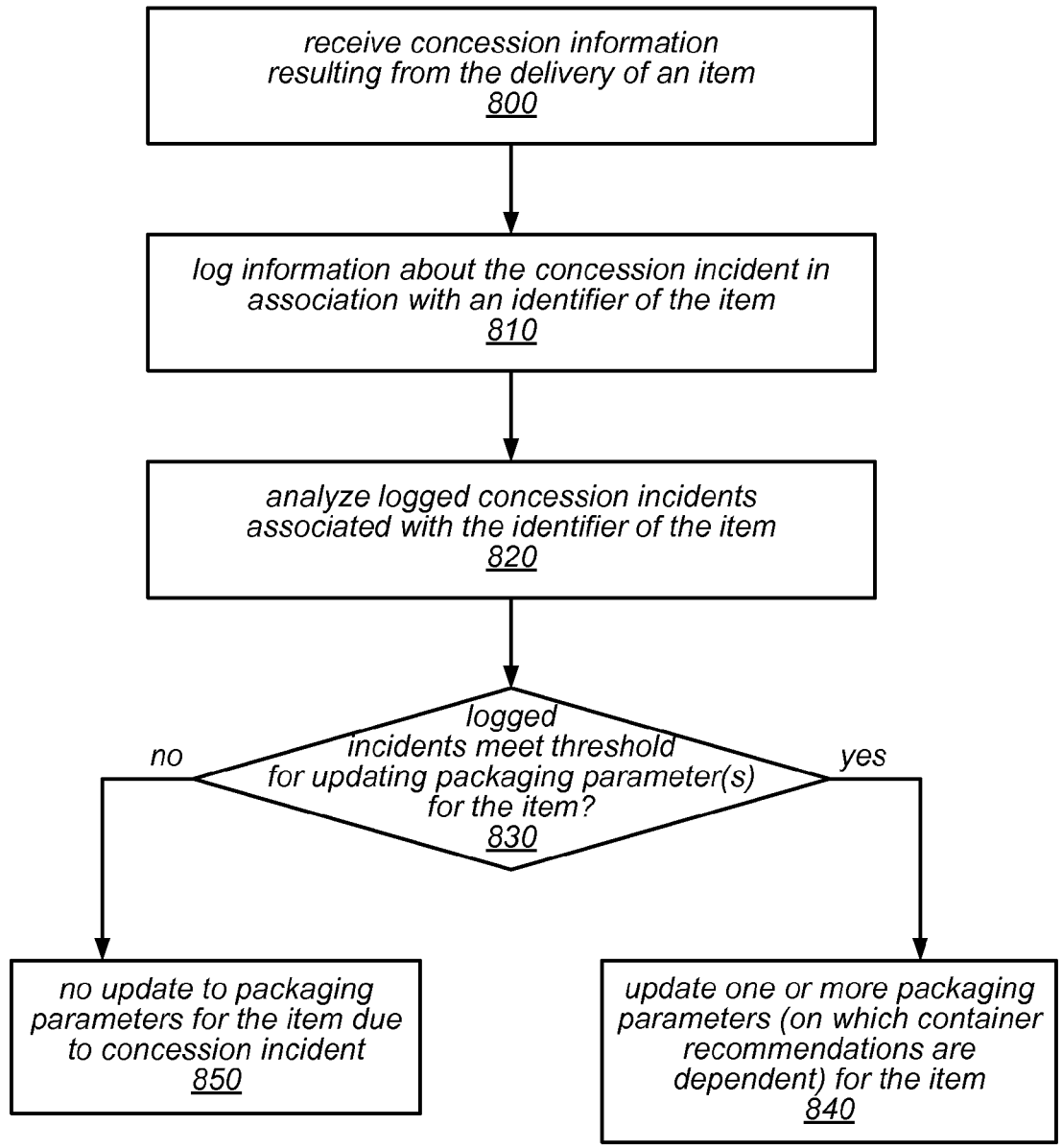
FIG. 8 is a flow diagram illustrating one embodiment of a method for incorporating concession information when determining recommended container options for handling one or more items.

As illustrated by the example in FIG. 4, the method may include analyzing additional data related to deliveries of the item to determine whether the item should be designated as one needing special damage protection, as in 440. For example, in some embodiments, the method may include determining whether there has been a recurring pattern of damage during shipping of the item. If the analysis indicates that special protection may be appropriate for the item, shown as the positive exit from 450, the method may include updating damage protection information for (or associated with) the item to indicate that special protection is recommended, as in 470. In some embodiments, this may include adding an identifier of the item to a list of identifiers of items designated as needing special damage protection. If the analysis indicates that special protection may not be warranted for the item at this time, shown as the negative exit from 450 (or if no negative feedback is received related to the item delivery, shown as the negative exit from 420), there may be no update to the damage protection information associated with the item, as in 460. Examples of methods for performing such analyses are illustrated in FIGS. 7 and 8, according to some embodiments.

Note that in some embodiments, even if an item is designated (e.g., by a container recommender or specialty packaging module thereof) as one for which special damage protection is recommended, the container recommender and/or a packing agent may be able to override this designation based on other factors. Similarly, an item that has not been designated as one for which special damage protection is recommended may be packaged using specialty packaging (as directed by the container recommender and/or a packing agent) based on other factors.

Figure 5:
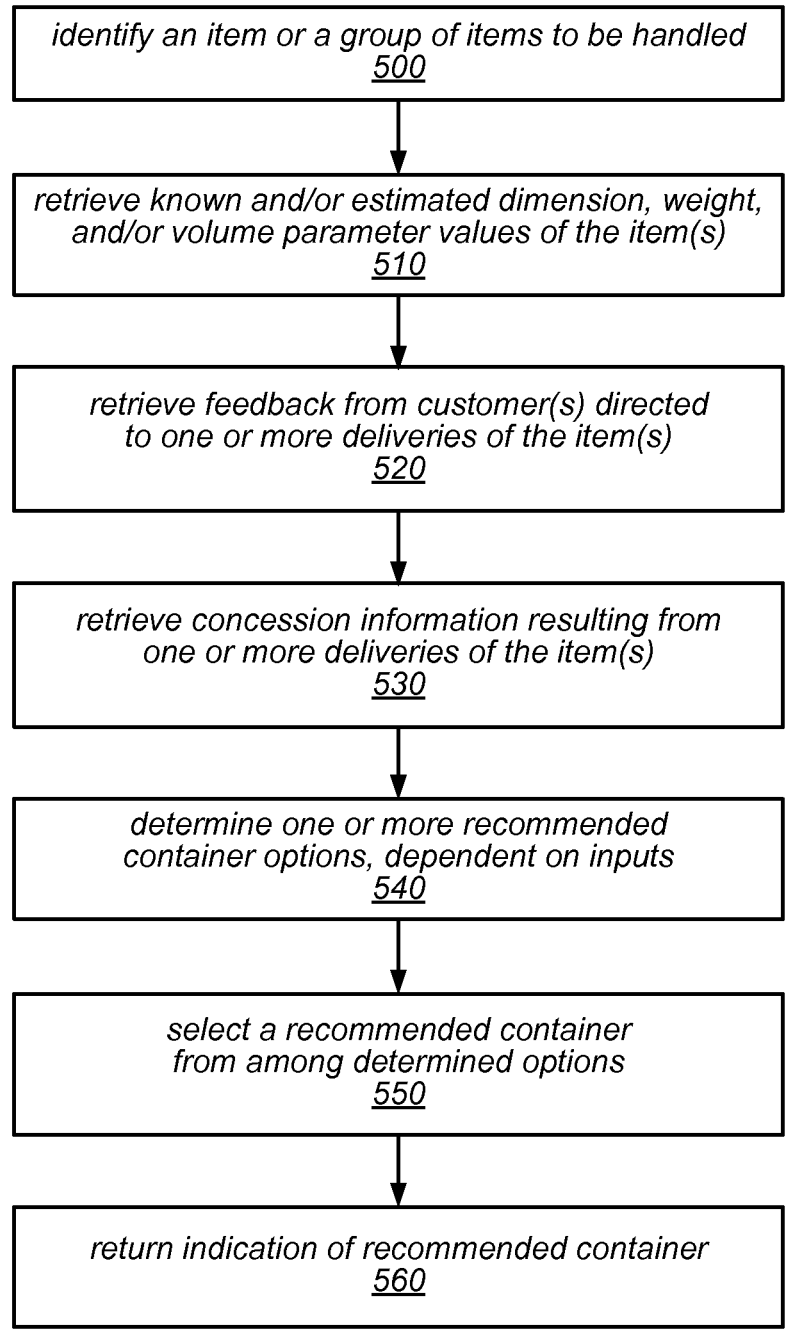
FIG. 5 is a flow diagram illustrating one embodiment of a method for recommending a container for handling one or more items, dependent on delivery related feedback.

One embodiment of a method for recommending a container for handling one or more items dependent on both physical characteristics of the item(s) and feedback from one or more deliveries of the item is illustrated by the flow diagram in FIG. 5. In this example, the method may include identifying an item or a group of items to be handled in a container, as in 500. As in a previous example, this identification may involve receiving a stow list, pick list, inventory list, order, packing list, etc., which may be a physical list, such as a printed list, or may be a virtual list, such as may be contained in a memory accessed directly by an automated container recommender, or such as may be displayed on a monitor, handheld device, or other suitable display mechanism. In some embodiments, such a list may be scanned automatically or by an agent in the materials handling facility to serve as an input to the automated container recommender.

Once the item or items to be handled are known, the automated container recommender may retrieve any estimated or known values of various physical parameters of the item(s), e.g., the dimensions, weights and/or volumes of the item(s), as shown in 510. In some embodiments, estimated or known dimensions, weights, and/or volumes of various items may be retrieved from a table (such as Table 1 described below) or a product database. As illustrated in this example, the method may also include the automated container recommender retrieving feedback from customer(s) directed to one or more deliveries of the item(s), as in 520. For example, in some embodiments, customer feedback information (e.g., ratings for the condition of received items and/or the containers in which they were shipped) may be retrieved from a product database or from a separate database that stores customer feedback information associated with various items and/or item shipments. In addition, the method may include the automated container recommender retrieving concession information resulting from one or more deliveries of the item(s), as in 530. For example, the container recommender may retrieve information about refunds, credits, and/or replacement items that were provided following the delivery of the item and/or other costs that were incurred as a result of damage during shipping of the item (e.g., re-work or re-stocking costs) from a product database or from a separate database that stores concession information associated with various items and/or item shipments. The concession information may include data indicating the reason for the incurred costs (e.g., the item was damaged but not returned, the item was damaged and returned, the container in which the item was shipped was too large or too small, the container in which the item was shipped was not sturdy enough, the container in which the item was shipped was crush or otherwise failed, etc.)

As illustrated in this example, the method may include determining one or more recommended container options, dependent on some or all of these inputs, as in 540. For example, in some embodiments, an automated container recommender may be configured to determine one or more options for a container, portal, or path for handling the group of items based on the estimated dimensions, volume, and/or weight of each of the items (and, in some cases, on the dimensions, volume, and/or weight of required non-item contents, if any), and dependent on which of the available containers are suitable for shipping the item(s), given any retrieved customer feedback and/or concession information. In some such embodiments, if the customer feedback and/or concession information indicates a recurring pattern of damage during shipments of the item(s), only the containers and/or specialty packaging that can handle the item(s) based on the physical characteristics of the item(s) and that also provide upgraded or above average damage protection for the item(s) may be considered. For example, if a particular item has been returned (and replaced) multiple times due to damage during shipping in a padded mailer, a sturdier and/or more protective container (such as a variable depth folder) may be recommended for subsequent shipments of the item. If damage still occurs frequently when shipping the item in variable depth folders, the system may be configured to direct that the item should subsequently be shipped in containers that are even sturdier and/or more protective (such as corrugated boxes filled with extra cushioning). As illustrated in this example, the method may include the container recommender selecting a recommended container from among the determined container options that are suitable for shipping the item(s) in light of any customer feedback and/or concession information for deliveries of the item(s), as in 550, and returning an indication of recommended container (e.g., the container ultimately recommended for use), as in 560.

Figure 6:
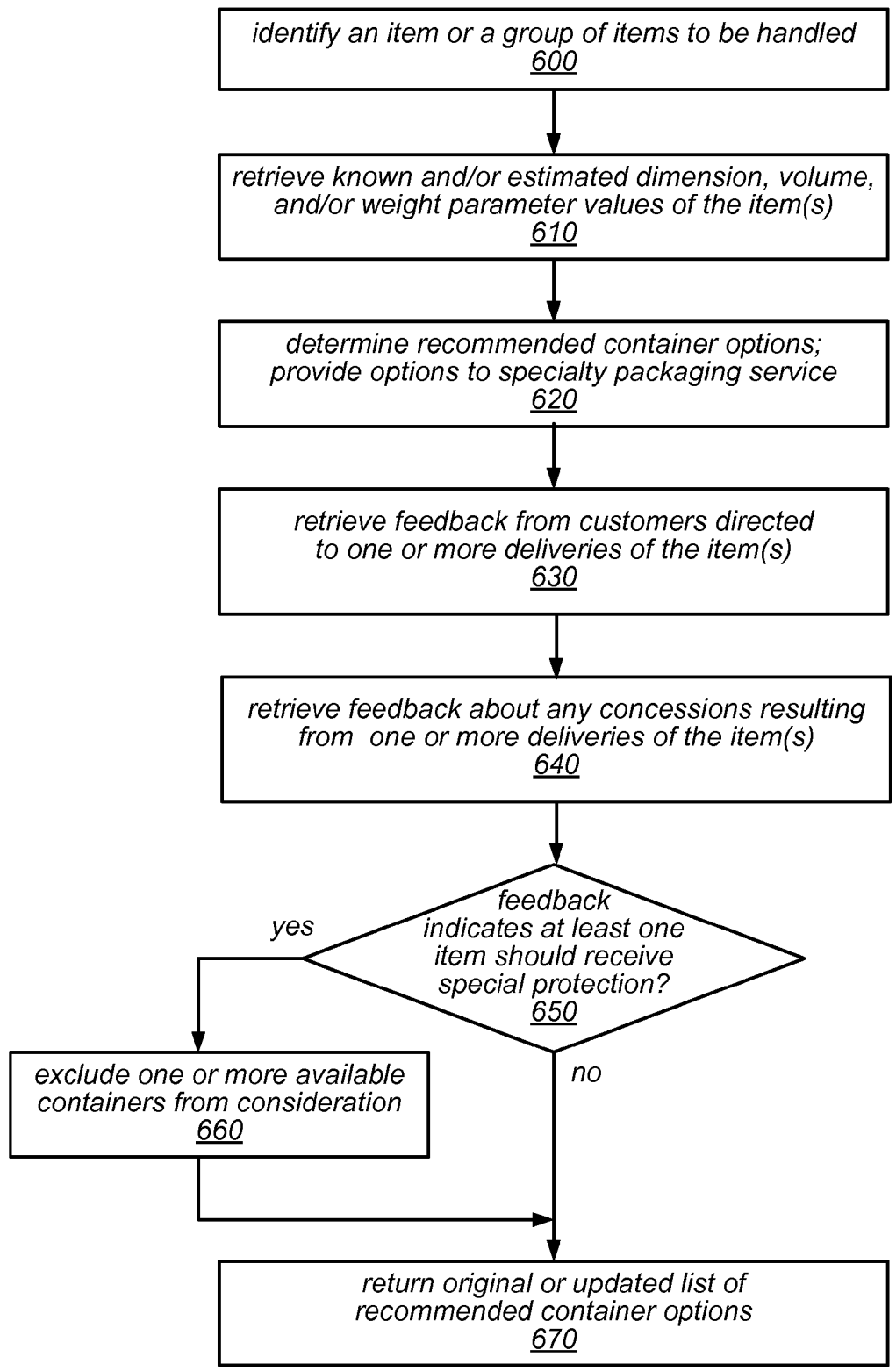
FIG. 6 is a flow diagram illustrating one embodiment of a method for recommending a container for handling one or more items dependent on both physical characteristics of the item(s) and delivery feedback.

Another embodiment of a method for recommending a container for handling one or more items dependent on both physical characteristics of the item(s) and feedback from one or more deliveries of the item is illustrated by the flow diagram in FIG. 6. In this example, a container recommender may first determine a set of container options for shipping one or more items based on physical characteristics of the item(s) and then a specialty packaging service may narrow those options based on the delivery-related feedback. As illustrated in this example, the method may include identifying an item or a group of items to be handled in a container, as in 600. As in previous examples, this identification may involve receiving a stow list, pick list, inventory list, order, packing list, etc., which may be a physical list, such as a printed list, or may be a virtual list, such as may be contained in a memory accessed directly by an automated container recommender, or such as may be displayed on a monitor, handheld device, or other suitable display mechanism. In some embodiments, such a list may be scanned automatically or by an agent in the materials handling facility to serve as an input to the automated container recommender.

In some embodiments, once the item or items to be handled are known, an automated container recommender may retrieve any estimated or known values of various physical parameters of the item(s), e.g., the dimensions, weights and/or volumes of the item(s), as shown in 610. In some embodiments, estimated or known dimensions, weights, and/or volumes of various items may be retrieved from a table (such as Table 1 described below) or a product database. As illustrated in this example, the automated container recommender may be configured to determine one or more recommended options for a container, portal, or path for handling the group of items based on the physical characteristics of the items, as in 620. For example, in some embodiments, an automated container recommender may be configured to determine one or more options for a container, portal, or path for handling the group of items based on the estimated dimensions, volume, and/or weight of each of the items and, in some cases, on the dimensions, volume, and/or weight of required non-item contents (if any). In some embodiments, the container recommender may recommend the smallest available container(s) in which the item(s) will fit, the portals through which they may pass, or the dimensionally-constrained paths on which they may be conveyed based on the overall dimensions of the item(s), the overall volume of the item(s) and/or the total weight of the item(s). In other embodiments, the container recommender may track container, portal, or path types corresponding to those handling various groups of item contents, and if so, may retrieve an indication of one or more appropriate container, portal, or path types for handling the current item(s) based on a stored mapping for those contents. As illustrated at 620, the recommended container options may be provided to a specialty packaging service.

As illustrated in the example in FIG. 6, once one or more recommended container options have been determined and provided to the specialty packaging service, the method may include the specialty packaging service receiving feedback from customer(s) directed to one or more deliveries of the item(s), as in 630. For example, in some embodiments, customer feedback information (e.g., ratings for the condition of received items and/or the containers in which they were shipped) may be retrieved from a product database or from a separate database that stores customer feedback information associated with various items and/or item shipments. In addition, the method may include the specialty packaging service retrieving concession information resulting from one or more deliveries of the item(s), as in 640. For example, the specialty packaging service may retrieve information about refunds, credits, and/or replacement items that were provided following the delivery of the item and/or other costs that were incurred as a result of damage during shipping of the item (e.g., re-work or re-stocking costs) from a product database or from a separate database that stores concession information associated with various items and/or item shipments.

If the feedback indicates that at least one of the item(s) to be handled should receive special damage protection, shown as the positive exit from 650, the method may include the specialty packaging service excluding one or more of the recommended container options from consideration, as in 660. In other words, the method may include the specialty packaging service removing from consideration any containers that are unsuitable for handling items that need special (or at least better) protection from damage. For example, the specialty packaging service may be configured to determine which, if any, of the container options determined to be candidates for handling the item(s) based on the physical characteristics of the item(s) are unsuitable for shipping the item(s), given any retrieved customer feedback and/or concession information. More specifically, if the customer feedback and/or concession information indicates a recurring pattern of damage during shipments of the item(s), one or more of the containers determined to be candidates for handling the item(s) based on the physical characteristics of the item(s) may be excluded from consideration in favor of containers and/or specialty packaging that may better protect the item(s) from damage during shipping. For example, if a plate has been repeatedly damaged when shipped in a padded mailer, all padded mailers may be excluded from consideration (even if they are of a size and shape that would otherwise recommend them as candidates for shipping the plate) in favor of sturdier containers and/or more protective packaging materials.

Once one or more unsuitable container options have been removed from consideration (or if no options are removed from consideration because no items are designated for special protection), the method may include the specialty packaging service returning the original list of recommended container options (e.g., if none of the candidate containers is determined to be unsuitable for shipping the item package) or an updated list of recommended container options, in which any options determined to be unsuitable for shipping the item(s) in light of any customer feedback and/or concession information for deliveries of the item(s) (i.e. the excluded container options) have been removed, as in 670. In other embodiments, rather than (or in addition to) removing unsuitable container options from consideration, the specialty packaging service may be configured to prioritize container candidates based on the designation of an item as needing special damage protection (e.g., prioritizing the containers having a size or shape suitable for shipping the item(s) in order of the amount of protection they provide). For example, corrugated boxes (which may provide the best crush protection for items) may be prioritized over variable depth folders, and variable depth folders (which provide some crush protection) may be prioritized over padded mailers (which provide very little crush protection). In still other embodiments, rather than returning a modified list of recommended container options, the specialty packaging service may be configured to select a container from among the recommended options that are suitable for shipping the item(s) in light of any customer feedback and/or concession information for deliveries of the item(s), and returning an indication of the selected container (e.g., the container ultimately recommended for use).

One embodiment of a method for incorporating customer feedback when determining recommended container options for handling one or more items is illustrated by the flow diagram in FIG. 7. As illustrated in this example, the method may include a container recommender (or specialty packaging service) receiving customer feedback directed to delivery of an item, as in 700. For example, the feedback may include a rating of the condition of the delivered item (e.g., a rating indicating whether, or to what degree, the item was damaged during shipping), and/or a rating of the appropriateness of the container in which the item was shipped (e.g., a rating indicating whether the size or type of container was appropriate for shipping the item). If the feedback includes a poor customer rating for item delivery, shown as the positive exit from 710, the method may include logging the received rating(s) in association with an identifier of the item, as in 720. For example, the container recommender (or specialty packaging service) may store customer feedback information (e.g., ratings for the condition of received items and/or the containers in which they were shipped) in a product database or in a separate database that stores customer feedback information associated with various items and/or item shipments, in different embodiments.

As illustrated in this example, the method may include analyzing logged ratings associated with the identifier of the item, as in 730, e.g., to determine whether there has been a recurring pattern of damage during shipping of the item. In different embodiments, such an analysis may be performed periodically (e.g., at pre-determined times or at regular intervals), or may be performed in response to receiving customer feedback about an item delivery. In some embodiments, the logged ratings that are analyzed may include ratings received in response to other deliveries of the item in addition to the most recently logged ratings. If the logged rating(s) meet a pre-determined, dynamically-calculated, or configurable threshold for updating packaging parameter(s) for the item, shown as the positive exit from 740, the method may include updating one or more packaging parameters (on which container recommendations are dependent) for the item, as in 750. For example, a policy may specify that packaging parameters should be updated for a given item if more than 10% of ratings related to item damage during shipping (e.g., damage ratings and/or ratings indicating inappropriate container types/sizes) are in an unacceptable range (e.g., "poor" or "unsatisfactory"). In other embodiments, the analysis may be based on median ratings, or on a median number of poor or unsatisfactory ratings in a given time period. In some embodiments, the threshold may be dynamically calculated and/or modified during runtime (e.g., using machine learning) or may be modified by an agent in the facility (e.g., due to changing conditions in the facility, changing patterns of received feedback, and/or other factors).

In some embodiments, if such a threshold is met, a damage protection flag or other packaging related parameter value may be updated in product database to indicate that the item should be designated as one needing special damage protection, an identifier of the item may be added to a list of identifiers of items needing special (or at least better) damage protection (e.g., a stronger container, additional protective packaging, or a custom or semi-customer container that better fits the size and/or shape or the item) and/or a parameter value may be associated with the item identifier indicating that certain package types should be excluded from consideration when shipping the item. If such a threshold is not met, shown as the negative exit from 740, no updates may be made to the packaging parameters for the item due to received feedback, as in 760. In other words, if the analysis indicates that special protection may not be warranted for the item at this time, there may be no update to the damage protection information associated with the item.

One embodiment of a method for incorporating concession information when determining recommended container options for handling one or more items is illustrated by the flow diagram in FIG. 8. As illustrated in this example, the method may include a container recommender (or specialty packaging service) receiving concession information resulting from the delivery of an item, as in 800. For example, the feedback may include an indication of a refund, credit, and/or replacement item that was provided following the delivery of the item and/or other costs that were incurred as a result of damage during shipping of the item (e.g., re-work or re-stocking costs). As illustrated at 810, the method may include logging information about the concession incident in association with an identifier of the item. For example, the container recommender (or specialty packaging service) may store concession information in a product database or in a separate database that stores concession information associated with various items and/or item shipments, in different embodiments.

As illustrated in this example, the method may include analyzing logged concession incidents associated with the identifier of the item, as in 820, e.g., to determine whether there has been a recurring pattern of damage resulting in various concessions during shipping of the item. In different embodiments, such an analysis may be performed periodically (e.g., at pre-determined times or at regular intervals), or may be performed in response to receiving information about a concession incident. In some embodiments, the logged concession information that is analyzed may include concession information received in response to other deliveries of the item in addition to the most recently logged concession information. If the logged information about concession incidents meets a pre-determined, dynamically-calculated, or configurable threshold for updating packaging parameter(s) for the item, shown as the positive exit from 830, the method may include updating one or more packaging parameters (on which container recommendations are dependent) for the item, as in 840. For example, a policy may specify that packaging parameters should be updated for a given item if a predetermined dollar amount and/or a pre-determined number of concession incidents involving this item is exceeded. In other embodiments, the analysis may be based on a median concession cost incurred over a given time period, or on a median number of concessions made in a given time period. In some embodiments, the threshold may be dynamically calculated and/or modified during runtime (e.g., using machine learning) or may be modified by an agent in the facility (e.g., due to changing conditions in the facility, changing patterns of received feedback, and/or other factors).

In some embodiments, if such a threshold is met, a damage protection flag or other packaging related parameter value may be updated in product database to indicate that the item should be designated as one needing special damage protection, an identifier of the item may be added to a list of identifiers of items needing special (or at least better) damage protection (e.g., a stronger container, additional protective packaging, or a custom or semi-customer container that better fits the size and/or shape or the item) and/or a parameter value may be associated with the item identifier indicating that certain package types should be excluded from consideration when shipping the item. If such a threshold is not met, shown as the negative exit from 830, no updates may be made to the packaging parameters for the item due to received concession information, as in 850. In other words, if the analysis indicates that special protection may not be warranted for the item at this time, there may be no update to the damage protection information associated with the item.

Note that in some embodiments, if a specialty packaging service determines that an item should be designated as needing special damage protection, the service may also be configured to designate similar items (e.g., item of the same type, items made of the same materials, items in the same product line, and/or item from the same vendor) as needing special damage protection. In some embodiments, an agent working in the materials handling facility may proactively designate certain items as needing special damage protection, e.g., based on the types of the items, the materials used to make the items, the product line, the vendor, the designation of similar items as needing special damage protection, or through observation based on experience working in the materials handling facility. Agents may also be able to enter other item parameter information received from a vendor of an item or observed by the agent (e.g., item affinity information, an indication of fragility, environmental constraints for shipping the item, or other information) into the packaging information system, in some embodiments.

Note also that in some embodiments, determining whether to designate an item as one for which special damage protection is recommended and/or determining whether to heed such a recommendation may involve trade-offs between the increased cost of shipping the item in a more protective container and/or with more protective packaging materials and the potential costs resulting from the item being damaged during shipping. In some embodiments, a recommendation to use specialty packaging for shipping an item may be overridden (either by another component of the packaging information system or by an agent) if the probability or impact of any damage is low enough to make any customer experience penalties, lost opportunity costs (e.g., losing an initial sale due to publicly available low customer ratings or losing repeat business due to a poor customer experience) or concessions (e.g., costs to replace the item or provide a partial refund) low relative to the cost of the increased specialty packaging. For example, the system may not recommend expensive packaging for an item costing only two dollars if the probability of damage is reasonably low, since the costs to replace the item is also low. In another example, if (historically) ten percent of champagne glasses shipped in a padded mailer break, and the champagne glasses cost $8.00 each, upgraded packaging may be recommended only if the cost per item for the upgraded packaging is less than $0.80.

Conversely, an item may be shipped in specialty packaging, even when it has not been designated as needing special damage protection if the potential customer experience penalties, lost opportunity costs and/or concessions costs times the probability of damage is high relative to the increased cost of the specialty packaging, or in order to provide a higher quality customer experience for premium customers or for shipping luxury items. For example, a luxury clothing item may be packaged and shipped in a sturdy box with lots of protective cushioning even if it would have fit in a large padded envelope. In another example, an expensive electronic item may be packaged and shipped in a large, sturdy box with lots of protective cushioning even if it would have fit in a smaller box without as much protective cushioning, since the cost to replace the item (if damaged) is high relative to the increased cost of the specialty packaging. Note also that in some cases, if the decision is made to ship an item using specialty packaging, the item may need to be shipped from a specific materials handling facility (e.g., one that is equipped to provide the specialty packaging). If the facility is not the closest facility to the destination for the shipment, the decision to upgrade the packaging may result in increased transportation costs, in addition to any increased materials costs.

Figure 9:
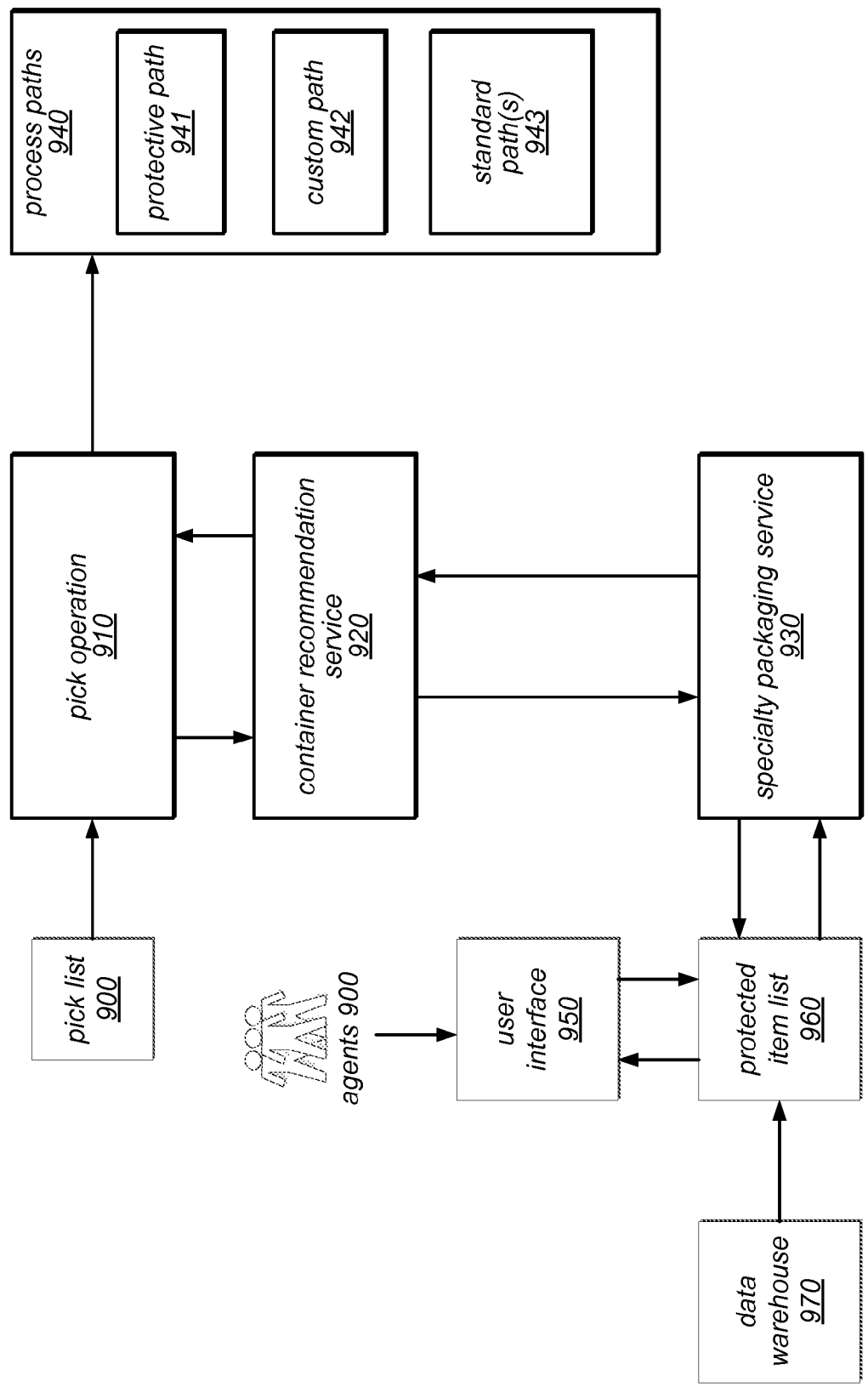
FIG. 9 is a block diagram illustrating one embodiment of a system configured for recommending containers for handling one or more items based on both physical characteristics of the items and feedback related to item deliveries.

FIG. 9 is a block diagram illustrating one embodiment of a system for recommending containers (including, in some cases, specialty packaging) for handling one or more items (e.g., for shipping) based on both physical characteristics of the items and feedback related to item deliveries. In this example, the system includes a pick operation 910, a container recommendation service (or container recommender) 920, a specialty packaging service 930, various process paths 940, a user interface 950 (through which various agents 900 interact with the system), and a data warehouse 970, which may store (and may provide to other components of the system) a protected item list 960.

In this example, the inputs to the system may include a pick list 900, which may include identifiers of one or more items to be shipped to a customer in response to receiving an order, and which may be provided to pick operation 910. In this example, the pick operation may pass the pick list to container recommendation service 920 and/or specialty packaging service 930 in order to obtain an indication of a recommended container in which to package the item(s) on pick list 900. In this example, pick operation 910 may require this information in order to determine which of the process paths 940 the picked item(s) should be routed to for packaging and shipping.

Additional inputs to the system for the given container recommendation exercise, which may also be passed to container recommendation service 920 and/or specialty packaging service 930, may include item dimensions, item weights, container dimensions, list of available container types and sizes, container costs, packaging costs, shipping options, and/or an identifier of the materials handling facility fulfill the order. The outputs of the given container recommendation exercise may include a modified list of candidate containers (from which container types likely to result in a bad customer experience based on received feedback have been removed). Note that various ones of these inputs may be retrieved from data warehouse 970, may be input by one or more agents 900, or may be obtained from other sources (not shown).

In this example, data warehouse 970 may also store customer feedback data and/or concession information, as described herein, and this feedback and/or concession information may used to update protected item list 960. In some embodiments, protected item list 960 may include a region- or facility-specific list of identifiers of items for which specialty (or at least upgraded) damage protection is recommended or required. This list may be developed dependent on the stored customer feedback data and/or concession information, the container types/sizes available in the facility, the available shipping options, a history of items damaged when shipped from the facility and/or when shipped using particular shipping carriers, or on other information.

For example, in one embodiment, protected item list 960 may include the identifiers of items that have experienced a high negative feedback rate using standard containers and protections, items for which high packaging concessions have been required in the recent past, and/or items that may otherwise be shipped in a grossly oversized, but highly underutilized container (e.g., a box larger than 14750 cm$^3$ that would ship with more than 90% air inside).

In the example illustrate in FIG. 9, agents 900 may view and/or update protected item list 960 through user interface 950. For example, agents 900 may define all or a portion of protected item list 960 proactively (e.g., adding or removing item identifiers from the list based on the designation of similar items, or on their own observations and/or experiences). In some embodiments, agents may define and/or modify rules and/or thresholds to be used by container recommendation service 920 and/or specialty packaging service 930 (e.g., when recommending containers or excluding containers from consideration) through user interface 950.

In this example, if the item(s) do not require special protective packaging, they may be routed to one of several standard process paths 943. This process path may be used in scenarios in which standard exclusion rules may be applied (such as a rule stating that if a mailing envelope or variable depth folder is excluded from consideration when shipping a light bulb, the item may be packaged in a corrugated box on this process path). If the item(s) require protective packaging, they may be routed to protected path 941. This process path may lead to a packing station at which special protective packaging material (not available on standard process paths) is available. If the item(s) require custom packaging (e.g., packaging in a custom or semi-custom built container), they may be routed to custom path 942. This process path may lead to a station at which a box can be built manually to fit the item or may be stocked with specific, rarely used box sizes to drive down shipments that utilize grossly oversized or custom containers.

Figure 10:
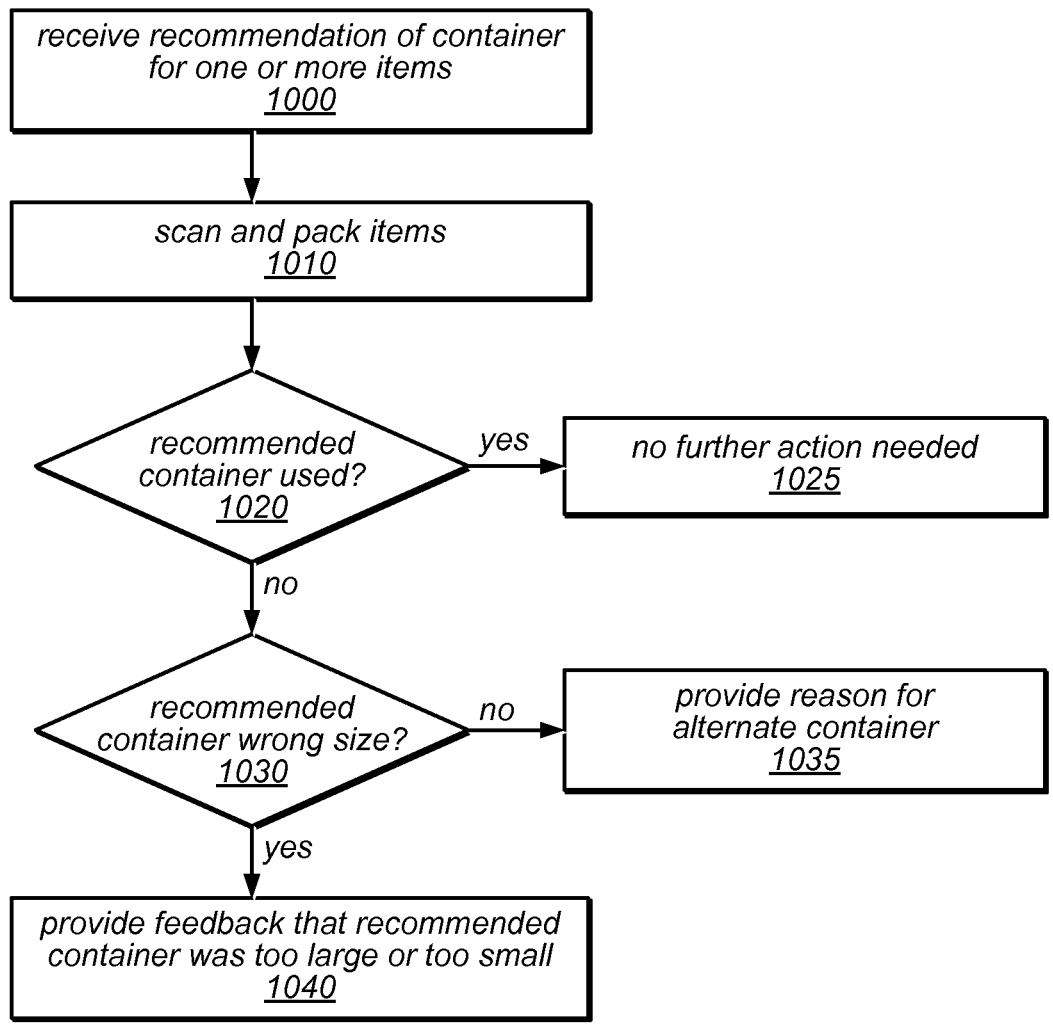
FIG. 10 is a flow diagram illustrating one embodiment of a method for utilizing a container recommender in a comprehensive packaging information system.

One embodiment of a method for utilizing a container recommender such as those described herein is illustrated by the flow diagram in FIG. 10. In this example, the method may include receiving a recommendation for a container in which to handle one or more items, as in 1000. For example, a packing list for an item package (whether electronic or paper) may include a recommendation of a box in which to ship the item(s). In some embodiments, the container may be recommended as a smallest container in which the item package (including the one or more items and/or any non-item contents) may be transported within a materials handling facility or in which the item(s) may be shipped and that satisfies any criteria specified by packaging parameters associated with the item(s), such as a damage protection parameter value indicating that the item(s) require upgraded or specialty packaging. The recommendation may be generated by, or received by, a container recommender module or specialty packaging service of a packaging information system, as described herein, which may be implemented in any combination of hardware and software within the materials handling facility, in various embodiments. In other embodiments, the recommendation may be received from a remote system that is configured to exchange information with the operations of the materials handling facility.

In this example, the method may include receiving an indication of a container actually used to handle the item(s). For example, a packing agent or automated packing mechanism may scan each of the items as they are packed in a box for shipping, as in 1010. This information (e.g., an identifier of each of the items and an identifier of the box) may be provided to the packaging information system (or an inventory management system thereof) automatically as the items and box are scanned, or may be explicitly provided at a later time (e.g., it may be uploaded when the packaging is complete and/or may include other feedback from the agent or automated operation).

In some embodiments, if a recommended container is inappropriately sized for handling the item(s), an agent or automated mechanism may select a more suitable container for the item(s) and feedback may be sent to the container recommender indicating that a recommended container was not used. This indication may be received from an agent, in some embodiments, or from an automated feedback mechanism of various operations of the materials handling facility. For example, if items and containers are scanned when the items are placed in a container for storage, transport, or shipping (and the scanned information is input to the packaging information system, or an inventory management system thereof), the system may receive an indication of the container in which the item(s) were actually handled. In some embodiments, a packing system may include a scanner or sensors and software to detect that one or more items are sticking out of a box, that a box will not close, or that a box is half-empty, and may be configured to select a different box for the item(s). In other embodiments, an agent of the materials handling facility, such as a picking, sorting or packing agent, may detect that a recommended container is not appropriate for the group of items intended to be placed in it and may provide an indication to the packaging information system (or an inventory management system thereof) to that effect and/or that one or more of the item dimension values for those items may be inaccurate. For example, an agent working in the facility may visually detect that one or more items is not completely contained within a recommended box, bin, tote, or shelf, or that a recommended box, bin, tote, or shelf is not filled to near its capacity, and may select a different container for the item (s). In yet another example, if an item or group of items is expected to be able to pass through a particular portal or fit through a particular chute based on currently stored item dimension values, but the item or items do not fit, an agent or an automated operation may provide feedback to the packaging information system (or an inventory management system thereof) indicating that the items do not fit and/or that one or more of the item dimension values for those items may be inaccurate.

As illustrated in FIG. 10, the method may include comparing the recommended container and the actual container used, as in 1020. For example, in one embodiment, the packaging information system (or a component thereof) may compare an identifier of the actual container (e.g., one received as feedback from an agent or automated operation) with an identifier of the recommended container to see if they match. Using this comparison, the packaging information system (or a component thereof) may detect that a recommended container was not used and/or that the item(s) were placed in a container smaller or larger than one recommended based on currently stored item dimension values for the item(s). Other methods of performing a comparison between an actual and a recommended container may be performed, in other embodiments.

In some embodiments, if the item(s) were packed in the recommended container, shown as the positive exit from 1020, no further action may be required on the part of the agent and/or automated system for this item package (as in 1025). In other embodiments, the method may include storing an identifier of the recommended container and/or the actual container along with information about the item(s) for further analysis (not shown). For example, a performance tracking operation of the materials handling facility may review the number of correctly recommended containers for different item packages and/or for item packages that include particular items in order to detect any issues with the container recommendation process. In general, any information collected as part of the packing operation may be stored in one or more tables, databases, or other data structures for further analysis.

If, however, the item(s) were not packed in the recommended container, shown as the negative exit from 1020, feedback may be provided to the packaging information system (or a component thereof). In some embodiments, an agent may provide feedback indicating one or more reasons why the recommended container was not used, such as that it was smaller or larger than necessary, or that the recommended container was available. In the example illustrated in FIG. 10, if feedback from an agent or an automated operation indicates that the recommended container was not used because it was the wrong size for the item package (e.g., if it was too small, was larger than necessary to contain the item(s), or was the wrong shape to contain them), shown as the positive exit from 1030, this information may be included in feedback provided by the agent or automated system, as in 1040. In this case, the packaging information system (or a component thereof) may, in some embodiments, incorporate this additional information when updating a value or confidence level for one or more dimension values for one or more of the items. If, on the other hand, the recommended container was appropriately sized for the item(s) but was not used, shown as the negative exit from 1030, the agent or automated system may provide feedback regarding the reason that the recommended container was not used, as in 1035. For example, the feedback may indicate that the recommended container may not have been available, that the recommended container was not strong enough for shipping heavy or fragile items included in the item package, or that the recommended container may not have been made of a material suitable for shipping fragile or sharp-edged items (e.g., the recommended container may be flexible, rather than stiff, or may be easily punctured.)

As noted above, any feedback provided by an agent or collected automatically by the system may be accessed by a package performance analyzer, in some embodiments. For example, a package performance analyzer or other performance tracking operation of the materials handling facility may review the number of mismatches between recommended and actual containers for different item packages when the recommended container was appropriately sized to detect any issues with the operations of the materials handling facility (e.g., if not enough boxes of a given size are being supplied to the facility). A package performance analyzer may be configured to determine whether an individual agent or packing line is responsible for an inordinate number of mismatches between recommended and actual containers and to take corrective action. A package performance analyzer may be a performance management tool applied to packaging-related and shipping-related operations. One such package performance analyzer is described in more detail below.

As described above, an agent or automated operation of the materials handling facility may in some embodiments provide feedback to facilitate any or all of the operations of a packaging information system, such as that described herein. For example, an agent or automated operation may provide inputs to a software application executing on a computing system in the facility (or remotely) that is configured to determine container recommendations and/or recommendations for specialty packaging. The software application may be configured to perform any or all of the functionality described herein, or similar functions suitable for performing other operations in a materials handling facility, as described herein.

In some embodiments, information about the actual containers used in handling one or more items during the operations described above may be automatically captured as a by-product of normal operation. For example, a packaging information system may receive or capture an identifier of such a container when an agent places an item in the container, according to various embodiments. Similarly, the packaging information system may automatically receive or capture an identifier of an item when it is placed in a container, passed through a portal, or put on a dimensionally-constrained path, in some embodiments. For example, a bar code or Radio Frequency Identification tag (RFID tag) of a container and/or an item may be automatically scanned and the data from the scanner may be automatically stored in one or more tables, databases, or other data structures accessible by the packaging information system (and/or various components thereof) when the item is placed in the container. In another example, an item may be scanned when it passes through a portal, such as a doorway between two rooms or buildings, or when it is placed in a chute. In some embodiments, items and corresponding containers, portals, or paths may be scanned as part of normal operations when items are stored, picked, transported, or sorted, or when they are placed in a container for shipping. Therefore, in some embodiments, no additional steps may need to be performed to capture identifiers of the items and the containers, portals, or paths used in handling them in the facility. In some embodiments, these identifiers may be associated with one or more entries in tables, databases, or other data structures containing item dimension values currently associated with various containers, portals, paths, and items.

While several of the example embodiments illustrated herein are described in terms of a group of items, the techniques described herein may be applied by the system to recommend a container, portal, or path suitable for handling a single item in the materials handling facility or for shipping a single item to a customer, in other embodiments.

A comprehensive packaging information system may be further described using the following example. In this example, an e-commerce organization sells items of various types that can be shipped to customers. Five example items are shown in an item parameter data store, in Table 1, below. In this example, the entry for each item includes a corresponding unique identifier, name, and type in columns 1-3. The item parameter data store also includes columns for storing values for various physical parameters of each item (columns 4-6), which in this example includes the item height, length, and width. The values in column 7, in this example, indicate whether or not the item has been designated to receive special damage protection.

TABLE 1

| item ID | item name | item type | item height (in) | item length (in) | item width (in) | damage protection (flag) |
|---|---|---|---|---|---|---|
| 4982 | book1 | book | 8.40 | 6.40 | 2.59 | false |
| 4325 | book2 | book | 8.29 | 6.40 | 2.59 | false |
| 2309 | plate38 | plate | 0.92 | 9.40 | 9.40 | true |
| 0873 | shoe17 | shoe | 14.00 | 8.00 | 6.54 | false |
| 1832 | DVD1 | DVD | 7.48 | 5.31 | 0.55 | false |

While not shown, in other embodiments additional information may be stored in an item parameters data store, such as a volume or weight of the item, a confidence level for the item dimension values, information on statistical variances in the dimension values, or other indications of allowable deviations from the dimension values. In some embodiments, a manufacturer or supplier may provide item dimensions for the items shown in Table 1. In other embodiments, the item dimension values may be values measured automatically or by agents in the facility, or may be values that have been estimated based on various containers in which the items have been handled. These dimension values may be used to recommend a container in which each item may be packaged, either alone or along with other items in an item package.

In some embodiments, dimensions and/or other parameter values for the containers, portals or paths may be stored in one or more tables, databases, or other data structures, such as the container parameters data store illustrated in Table 2 below. In this example, a container identifier, a container name, and a container type are stored in each entry of Table 2 in columns 1-3. Dimension values for various containers, portals, and paths are shown in columns 4-9. In some embodiments, a manufacturer or supplier of a container may provide the values of various container parameters, including container dimensions. In other embodiments, container, portal, or path parameters may be determined by measuring one or more instances of each container, portal, or path type.

As previously noted, a reference to a "container" may include a reference to any dimensionally-constrained environment, including conventional containers (e.g., boxes, envelopes, bins, and the like), portals (doorways, hatches, etc.) and dimensionally-constrained paths (chutes, tracks, conveyor belts, etc.), as described herein. In this example, the available containers include three types of boxes in which items may be shipped (as shown in rows 1-3 of the data store), three types of containers or paths in which items may be conveyed in the materials handling facility (as shown in rows 4-6 of the data store), two types of containers in which items may be stored in the materials handling facility (as shown in rows 7-8 of the data store), one portal through which items may pass in the facility (as shown in row 9 of the data store), and two types of mailing envelopes in which items may be shipped (as shown in rows 10-11 of the data store).

TABLE 2

| container ID | container name | container type | height (inches) | length (inches) | width (inches) |
|---|---|---|---|---|---|
| 413 | smallbox1 | box | 19.0 | 13.0 | 11.75 |
| 293 | smallbox2 | box | 22.0 | 18.0 | 11.75 |
| 338 | bigbox1 | box | 24.00 | 16.00 | 16.00 |
| 103 | tote1 | tote | 24.00 | 24.00 | 12.00 |
| 391 | cart2 | cart | 48.00 | 36.00 | 24.00 |
| 789 | belt1 | belt | — | 47.50 | 24.00 |
| 651 | bin7 | bin | 27.00 | 18.00 | 15.00 |
| 265 | shelf3 | shelf | 33.00 | 27.00 | 18.00 |
| 739 | gate7 | portal | — | 60.00 | 48.00 |
| 557 | mailer1 | mailer | 0.25 | 5.00 | 5.00 |
| 806 | mailer2 | mailer | 0.40 | 9.00 | 12.00 |

In the example illustrated by Table 2, the values for the height, length, and width are shown for each container except for the conveyor belt, labeled belt1, and the portal, labeled gate7. In some embodiments, a manufacturer or supplier may provide the volume along with the dimensions, while in other embodiments, the packaging information system may calculate the volume from supplied or measured dimensions. In this example, the length of belt1 may not be specified because the conveyor belt length may not be a restricting dimension. That is, as long as an item may be placed on the belt (without overlapping its width) and is not too tall to pass through any spaces in the materials handling facility through which the conveyor belt passes, the item may be said to "fit" on the conveyor belt. Similarly, the length of gate7 may not be specified because it may not add any constraints on the items that pass through gate7. In some embodiments, additional information about various containers (e.g., the weight or volume of the containers, a strength rating, or an indication of protective packaging materials or filler to be used in preparing items for shipment in the containers) may be maintained in a container parameters data store. In general, such a data store may include the values of more, fewer, or different parameters than those illustrated in Table 2.

In some embodiments, the packaging information system may store recommended and actual container dimensions for item packages in a table, database, or other data structure, such as Table 3 below, and may use this information to analyze various packaging related operations in the materials handling facility. In this example, Table 3 illustrates a package parameters data store, in which each entry (row) includes information about actual versus recommended containers for item packages handled in the materials handling facility or shipped to customers. Note that in some embodiments the grouping of items within containers may be temporary and may change with various operations of the facility. For example, items for several orders may be placed together in a tote during a "pick" operation and then sorted into different groups, by order, and placed into boxes for shipping. Therefore, the information stored in a package parameters data store, such as the one illustrated by Table 3, may, in some embodiments, represent snapshots in time for particular containers and those containers may contain other items at other times. Each of these snapshots may include a unique group or package identifier, as shown in column 1, in some embodiments. In other embodiments, a package identifier may correspond to a particular customer order or container, rather than a snapshot of an item grouping.

In this example, each entry includes a list of the container contents (e.g., the contents of an item package) along with the number of copies of each item included in the item package, and the identifiers of both the recommended container and the actual container used to handle the item package. For example, in Table 3, column 3 is used to store the name of the container recommended to handle each item package, and column 4 is used to store the name of the actual container used to handle each item package. In other embodiments, the recommended and/or actual container dimensions may be included in the package parameters data store whether or not they are stored in another data store, such as the one illustrated by Table 2. In this example, columns 5-6 may be used to store customer feedback for an item package shipment (e.g., customer ratings for damage and container size, respectively), and column 7 may be used to store concession costs incurred for the item package shipment. In the example illustrated in Table 3, item package 872093, which included a plate for which special damage protection was designated, was shipped in a mailing envelope, rather than in the recommended box. This resulted in a "poor" rating for damage, a "fair" rating for the size of the mailer, and a concession cost of $21.75 (e.g., to replace the plate or otherwise compensate the customer for the poor condition of the plate when it was received).

In some embodiments, additional information may be stored in a package parameters data store, such as a date or timestamp for each entry or a batch number or other identifier of specific item or item group instances (not shown). In other embodiments, more, fewer, or different parameters may be stored in a package parameters data store, or similar information may be stored in other combinations in one or more other tables, databases, or other data structures.

TABLE 3

| package ID | package contents | recom. cont. | actual cont. | damage rating | size rating | concessions cost |
|---|---|---|---|---|---|---|
| 872093 | plate38 | smallbox2 | mailer2 | poor | fair | $21.75 |
| 832189 | book1x3, book2x4, book3x7 | smallbox2 | smallbox2 | excellent | good | $0.0 |
| 098731 | book2x12, DVD1x2 | smallbox1 | smallbox1 | excellent | good | $0.0 |
| 631248 | book1x4 book2x8 shoe17x3 | bigbox1 | bigbox1 | excellent | good | $0.0 |

While several of the examples described above involve item packages that include two or more items, the methods may be applied by the system to recommend a container suitable for handling a single item in the materials handling facility and/or to determine if dimensions stored for the item are inaccurate based on the actual container used to handle the item, in other embodiments.

In some embodiments, and in some situations, it may be assumed that all items in a group must fit entirely into each of the containers in the materials handling facility into which they are placed (e.g., for shipping). In other embodiments and/or situations, this restriction may not be required. For example, in some embodiments, it may be permissible for items to stick out of the top or side of a tote, belt, etc., when being stored or transported within the materials handling facility.

As noted above, a package performance analyzer may in some embodiments be used as a performance management tool within a materials handling facility, to measure and continuously improve the performance of packaging-related and shipping-related operations. For example, the package performance analyzer may be implemented as a software application configured to determine excess shipping costs incurred as a result of shipping item packages in inappropriately sized containers and/or containers that do not adequately protect item contents during shipping, as described above.

A package performance analyzer may in some embodiments be configured to generate packaging performance reports based on information collected from the various operations of the facility and on expected and actual shipping costs calculated by the package performance analyzer. For example, the package performance analyzer may in some embodiments be configured to produce a summary of container types used in the facility, a comparison of container types used vs. recommended container types, a comparison of actual shipping costs vs. expected shipping costs, mismatches between recommended and actual containers used within the facility, and costs associated with these container mismatches. In some embodiments, the data included in reports generated by the package performance analyzer may be sorted by time/date or time/date range, by item package identifiers, by location, by site, by facility, by process path, by packing station, and/or by agent. The information in the reports may be presented in terms of raw data (e.g., a count of each event being reported), or as a percentage of events being reported, in different embodiments. Examples of the types of reports that may be generated by the package performance analyzer are described below. In other embodiments, other types of packaging performance reports that may be useful in assessing and improving the operations of a materials handling facility may be generated by the package performance analyzer based on the information accessible to the package performance analyzer.

In some embodiments, a package performance analyzer may be configured to receive an indication of a container recommended to collectively handle one or more items for shipping and to calculate the expected cost of shipping the item(s) in the recommended container. The recommendation of a container for shipping the item(s) may be dependent on stored dimension values for each of the item(s) and/or on the values of various packaging parameters (e.g., a damage protection parameter), in some embodiments. The expected shipping cost may include both an expected transportation cost and an expected shipping materials cost. The transportation cost may be determined by a transportation method selector dependent on factors such as the size of the recommended container, the weight of the packed container, a requested delivery date, and/or the destination, in various embodiments. The expected shipping materials cost may include both the cost of the recommended container itself and any non-item contents expected to be included in the recommended container when shipped, including any specialty packaging materials used to protect item(s) during shipping.

A package performance analyzer may be implemented within the facility in one or more software modules executing on one or more nodes of a computing system (e.g., as program instructions and data structures configured to implement functionality described), or in any combination of hardware and software components suitable for implementing the functionality described. It may be configured to receive inputs from other software applications, agents working in the facility or remotely, and/or automated systems within the facility (e.g., scanners, sensors, automated storing, picking, or packing equipment, or software applications managing one or more local or remote data stores.) For example, when an item is placed in a container for shipping, a container identifier (e.g., a bar code) and an item package identifier may automatically be scanned, or these identifiers may be input by a packing agent. In addition, an identifier of the packing station and/or agent responsible for packing the item package for shipping may be automatically captured or manually input. Any or all of this information, along with other information received from and/or stored by other operations in the materials handling facility may serve as inputs to the package performance analyzer.

Figure 11:
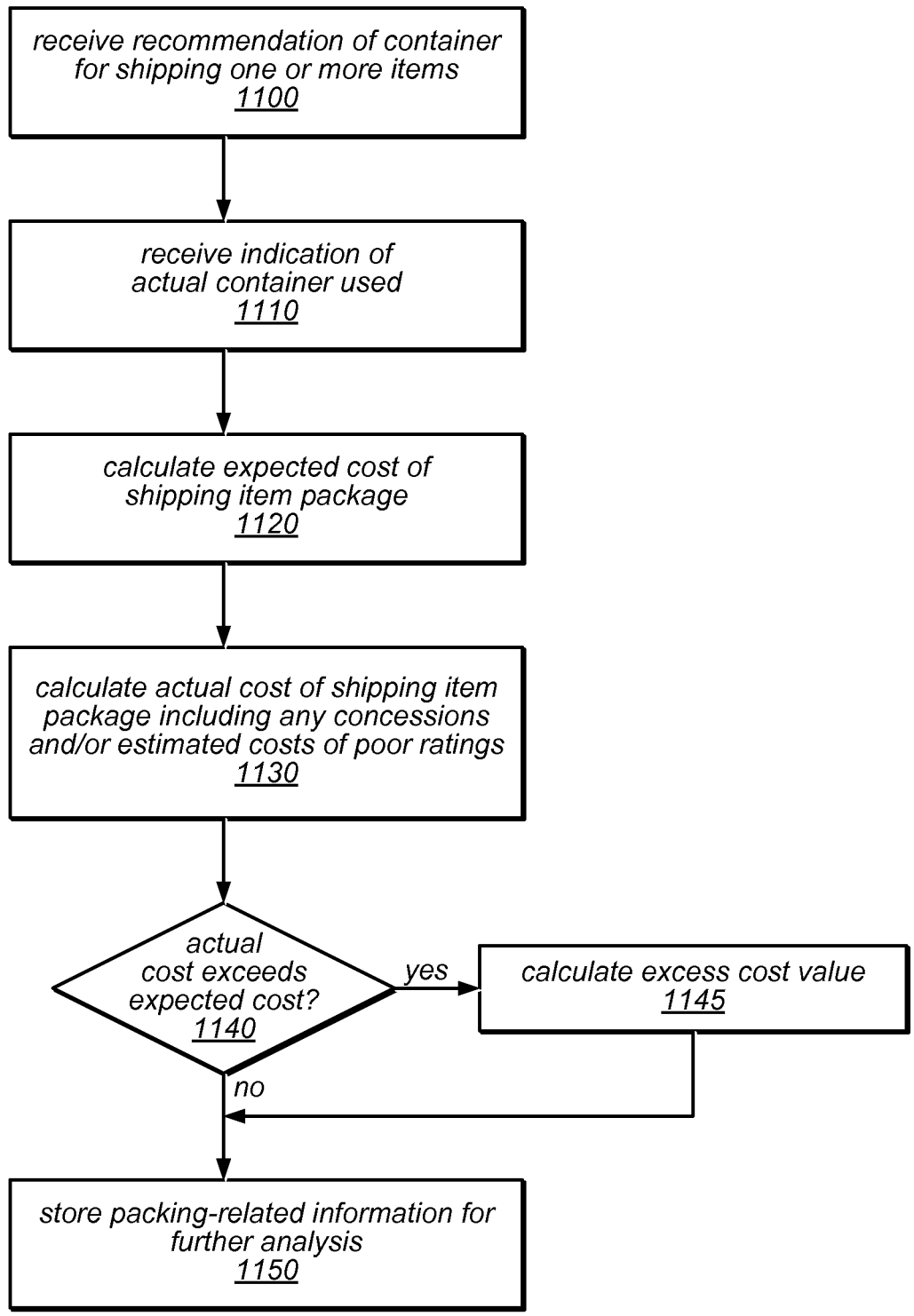
FIG. 11 is a flow diagram illustrating one embodiment of a method for performing package performance analysis.

A method for carrying out package performance analysis, according to one embodiment, is illustrated in FIG. 11. In this example, a recommendation of a container for shipping one or more items may be received, as in 1100. In some embodiments this recommendation may be generated dependent on physical characteristics of the item(s) (e.g., stored item dimension values, weights, and/or volumes) and/or on customer feedback or concession information associated with delivery of the item(s), as described herein. The method may also include receiving an indication of the actual container used to handle the item package, as in 1110. As noted above, this indication may be automatically captured or may be input (or caused to be captured), by an agent in the facility, in different embodiments.

As illustrated at 1120, the method may include calculating an expected cost of shipping the item package. The expected shipping cost may in some embodiments be calculated as the sum of the expected transportation cost and the expected shipping materials costs associated with shipping the item package in the recommended container. In some embodiments, the expected shipping cost may also include a customer experience penalty that is associated with the combination of the recommended container and one or more items in the item package. The expected transportation cost may be determined by another software application executing on one or more nodes of a computing system, such as a transportation method selector, configured to determine the most cost-effective shipping method for a given item package based on various factors including, but not limited to, size (i.e., the size of the recommended container), weight (e.g., the total weight of the items in the item package and the shipping materials), the requested delivery time (e.g., overnight, 2-day, or ground shipping) and the destination, in different embodiments.

In some embodiments, the package performance analyzer may be configured to invoke a transportation method selector to request an expected shipping cost for an item package and may provide the transportation method selector with an indication of the item package contents and any non-item contents as an input to the selection process. For example, the package performance analyzer may be configured to determine that the item contents plus ten air bag fillers may be handled in the recommended container and to pass this information to the transportation method selector. In such embodiments, the transportation method selector may be configured to access one or more tables, databases, or other data structures, such as an item parameters data store (such as that illustrated in Table 1) and/or a container parameters data store (such as that illustrated in Table 2), in order to obtain the weight of the items and shipping materials. In other embodiments, the package performance analyzer may be configured to obtain the weight of the items and shipping materials and to pass this information to the transportation method selector for use in determining the most cost-effective shipping method and the corresponding transportation cost for the item package.

The expected shipping materials costs may include the cost of the recommended container itself, as well as the costs of any non-item contents expected to be included in the container when it is shipped. For example, the container may be expected to contain air bags, bubble wrap, or foam used as protective padding or filler, promotional inserts from the organization, or other non-item contents, in some embodiments. The non-item contents expected to be included may be determined according to current standard procedures for filling containers (which may be dependent on the values of damage protection parameters for the items), and/or current advertising guidelines for various types of item packages or customers, in various embodiments. For example, in some embodiments, the package performance analyzer may be configured to determine the number of air bags needed to fill empty spaces in the recommended container along with the item package contents according to a standard packing algorithm. In other embodiments, the package performance analyzer may be configured to determine the amount of bubble wrap needed to protect an item designated for specialty packaging. Therefore, the expected shipping materials costs for one item package may be the sum of the container costs (e.g., $1.20) and the cost of the air bags (e.g., 10 air bags at a cost of $0.03 each, or $0.30) or bubble wrap (which may be more expensive than air bags). The package performance analyzer may in some embodiments be configured to access one or more tables, databases, or other data structures, such as an item parameters data store (such as that illustrated in Table 1) and/or a container parameters data store (such as that illustrated in Table 2), in order to obtain the costs of the shipping materials. If the transportation cost of the item package (when shipped in the recommended container) is $6.37, in this example, then the total expected shipping cost may be $7.87.

As illustrated in FIG. 11, the method may also include calculating the actual shipping cost of the item package, as in 1130. The actual shipping cost may in some embodiments be calculated as the sum of the actual transportation cost and the actual shipping materials costs associated with shipping the item package in the actual container. The actual transportation cost may be determined by the transportation method selector dependent on size (i.e., the size of the actual container), weight (e.g., the total weight of the items in the item package and the shipping materials), the requested delivery time (e.g., overnight, 2-day, or ground shipping) and the destination, in different embodiments. In other embodiments, the actual transportation cost may be obtained from another operation of the materials handling facility, such as from a shipping services or financial services operation, and may reflect the amount actually invoiced and/or paid for shipping the item package in the actual container. Using the example above, if the actual container is larger than the recommended container and the actual shipping cost is $8.53, the excess shipping cost due only to the shipping cost is $2.16.

The actual shipping materials costs may in some embodiments be calculated in a manner similar to that described above regarding the expected shipping materials costs. For example, the package performance analyzer may in some embodiments be configured to obtain the costs of the actual package and any other non-item shipping materials that would be included in the package (according to current practices) from one or more data stores, such as those described above. In other embodiments, an indication of the actual non-item materials content may be input automatically by the system (e.g., as it is added to the container) or manually by an agent. Using the example above, if the actual container is larger than the recommended container and costs $1.87, the total actual shipping cost is $11.00. In this example, the excess shipping cost due to the wrong container being used is $0.67.

Note that in some embodiments, only those non-item contents that are affected by the container choice may be included in the package performance analysis. For example, if the same promotional materials would be included with an item package regardless of the size of the container, this information may not be considered when determining the expected shipping cost and/or the actual shipping cost, since it would not affect the comparison of the two. Conversely, the number of air bags added to an actual container and a recommended container may not be the same, as more filler may be required to protect the item package contents in a larger container than a smaller one. Using the example above, if twenty air bags are needed to fill the empty space in the actual container (rather than the ten air bags expected to be used in the recommended container), then excess shipping materials cost due to the non-item contents may be $0.30.

In some embodiments, the costs of any concessions resulting from damage to the item(s) during shipping may be included in the actual costs of shipping the item(s) and may be stored together with the other costs for shipping the item package. For example, the actual costs may include the cost of replacing a damaged item, or for providing a partial refund as compensation for a damaged item. Similarly, if poor customer feedback related to shipping the item(s) is received, a cost representing a potential or real loss of new and/or repeat business due to ill will or bad publicity as a result of poor customer ratings (i.e., a lost opportunity cost or customer experience penalty) may be included in the actual costs of shipping the item(s) and may be stored together with the other costs for shipping the item package.

As illustrated in FIG. 11, the method may include determining if the actual shipping cost exceeds the expected shipping cost, as in 1140. In some embodiments, this may be performed by comparing the two values, or by subtracting one from the other, for example. If the actual shipping cost exceeds the expected shipping cost for this item package, illustrated as the positive exit from 1140, the method may include calculating the excess cost value, as in 1145. In some embodiments, this may be calculated as the difference between the two values. In the example above, the difference between the expected shipping cost and the actual shipping cost is $3.13, excluding any costs due to concessions or representing a loss of business.

The method may also include storing packaging-related information for further analysis, as in 1150. For example, in some embodiments, any or all of the item package identifier, expected shipping cost (and/or any of its components, such as the transportation cost or container cost), actual shipping costs (and/or any of its components), excess cost value, recommended container identifier, actual container identifier, identifier of an agent or packing station responsible for packing the item package for shipping, concession costs, costs representing lost business, or any other relevant information may be stored in one or more tables, databases, or other data structures for analysis by the package performance analyzer or another operation of the materials handling facility.

The method illustrated in FIG. 11 may in some embodiments be executed continuously in the materials handling facility. For example, the package performance analyzer may be configured to receive information regarding the recommended and actual containers used to ship each item package automatically as part of the packing and/or shipping operations. Similarly, the package performance analyzer may be configured to receive information regarding concessions and/or poor customer ratings automatically as part of various customer-facing and/or feedback-gathering operations. In some embodiments, receiving this information may automatically trigger an analysis of the item package. In other words, the package performance analyzer may perform the operations illustrated in FIG. 11 shortly after an item package is packed and/or shipped in response to the item package being packed and/or shipped or in response to receiving feedback about a particular shipment. In other embodiments, the operations illustrated in FIG. 11 may be performed by the package performance analyzer on a pre-determined schedule or in response to a request for a package performance report. For example, the package performance analyzer may in some embodiments be configured to perform the operations illustrated in FIG. 11 at the end of each shift for all the item packages that were packed and/or shipped during the shift and/or for any item packages for which feedback was received during the shift. In such embodiments, the package performance analyzer may also be configured to generate one or more standard reports using the newly generated expected and actual shipping costs. In another embodiment, the package performance analyzer may be configured to perform the operations illustrated in FIG. 11 in response to an explicit indication that they should be performed, such as a user input indicating that an analysis should be performed for all item packages packed and shipped since the last analysis or a user input indicating that one or more reports should be generated.

As noted above, the package performance analyzer may include a user interface component, such as a web browser interface, configured to allow a user to view and/or analyze packaging-related information. For example, a user may access the package performance analyzer through a web browser on a report console and may request that a particular package performance report be generated.

Figure 12:
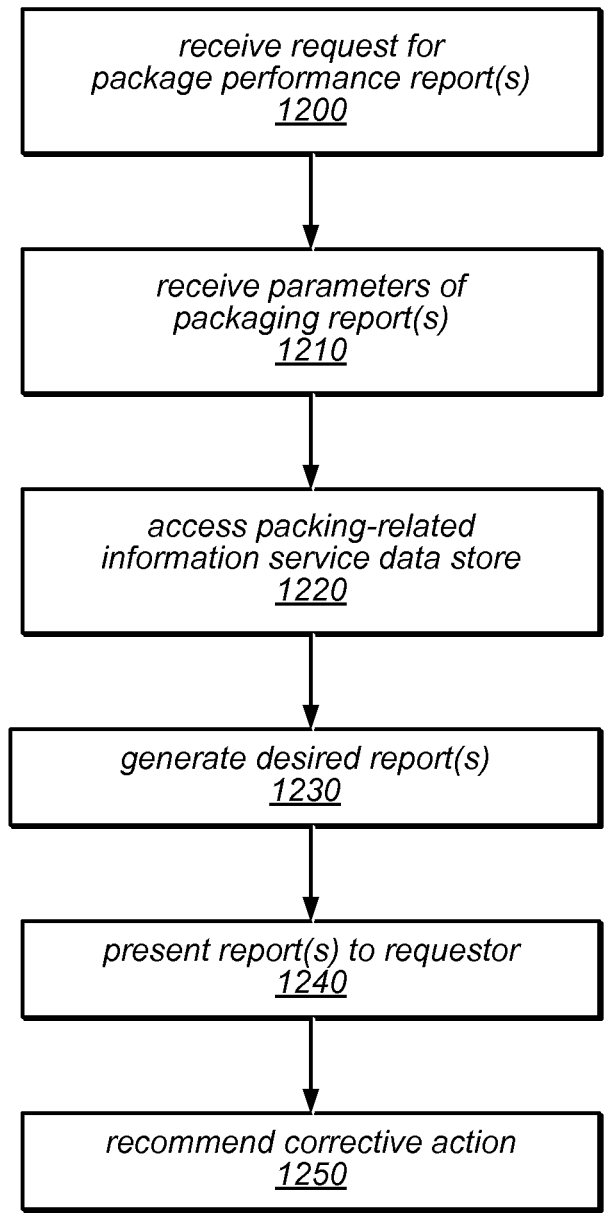
FIG. 12 is a flow diagram illustrating one embodiment of a method for generating package performance reports.

One method for providing package performance reports, according to one embodiment, is illustrated in FIG. 12. In this example, a request for one or more package performance reports may be received, as in 1200. In some embodiments, a user may select one or more specific report types using a pull-down menu, by selecting one or more radio buttons, or by entering one or more report type names in an input window of a web page, for example.

As illustrated in FIG. 12, the method may include receiving report parameters for the one or more selected package performance reports, as in 1210. For example, depending on the report type, the user may in some embodiments be prompted to specify one or more of a time or date; a time or date range; a particular facility, site, location, operation, or agent; an item identifier or an identifier of an item group or type; a threshold above which excess cost values should be reported; or another parameters relevant to the analysis. In some embodiments, default parameter values may exist for any or all parameters corresponding to one or more report types.

Once the report type(s) and any applicable parameters have been specified, the method may include accessing packaging-related information from one or more data stores, such as those described herein. This is shown as 1220. For example, if a user has requested a report comparing expected vs. actual shipping costs for all item packages in the facility in the last week, the package performance analyzer may be configured to access these costs from the data store in which it stored them when the item package was shipped and/or when any feedback about the shipment was received. As noted above, the actual costs may include the costs of any concessions resulting from the shipment, and/or any customer experience penalties or lost opportunity costs associated with poor customer ratings. Similarly, if a user has requested a report summarizing the excess shipping costs associated with a particular agent in the facility, the package performance analyzer may be configured to search one or more data stores for entries corresponding to item packages packed by the agent and for which an excess shipping cost was calculated (i.e., for which actual shipping costs, which may include customer experience penalties, lost opportunity and/or concessions costs, exceeded expected shipping costs.) In some embodiments, a user may specify a format for the requested reports using the parameter input mechanisms (e.g., a tabular output, an output graph, data represented as a count of events or entries, or data represented as a percentage of events or entries.) In yet another example, a user may request a reporting identifying items that have been designated as needing special damage protection (e.g., a list of all items so designated, a list of all items so designated within a particular facility, or a list of items for which such a designated was recently added or removed) and/or the costs associated with those items being shipped with or without the recommended specialty packaging.

As illustrated in FIG. 12, once the necessary information has been extracted from the appropriate data stores, the requested reports may be generated, as in 1230. For example, generating the requested reports may include sorting the extracted data, performing one or more mathematical transformations on the data (e.g., aggregated costs, averaging costs, counting a number of entries matching the report parameters, calculating the percentage of entries matching the report parameters, etc.) Generating the requested reports may in some embodiments include formatting the requested information according to the specified report parameters. For example, a report summarizing the reasons given for a mismatch between recommended and actual containers may be formatted as a pie chart or bar graph, in different embodiments.

Once the requested reports have been generated, they may be presented to the requestor, as in 1240. For example, reports in a tabular and/or graphical format may be displayed on a computer system, such as in a web browser window on a report console, in some embodiments. In other embodiments, reports may be printed, emailed, or otherwise transmitted to one or more interested parties. For example, in some embodiments, a standard set of package performance reports may be generated on a pre-determined schedule (e.g., daily, weekly, or monthly) and transmitted to one or more operations managers in the materials handling facility for review.

The reports generated by the package performance analyzer may be used to identify recurring errors, problems with performance for a particular packing station or agent, poor availability or suitability of particular container types, or other packaging-related performance issues that may be contributing to container waste, product damage, and/or avoidable excess shipping costs, in some embodiments. In some embodiments, the package performance analyzer may be configured to identify performance issues from the report data and to recommend corrective action, as in 1250. Feedback received from the various operations of the facility may also be used in determining performance issues and/or appropriate corrective actions. For example, if report data indicated that a particular packing agent is responsible for packing an inordinately large number of item packages in containers larger than the recommended containers, the package performance analyzer may be configured to recommend additional training for the agent. On the other hand, if report data indicates that the reason a particular recommended container was not used for a large number of item packages is that it was not available, the package performance analyzer may instead be configured to recommend that more of the particular container type be stocked and/or assembled for use in the facility or in the particular processing path for which it was not available.

In some embodiments, the package performance analyzer may be configured to analyze various trade-offs between the increased costs of providing specialty packaging and any concession costs, customer experience penalties, and/or lost opportunity costs. The package performance analyzer may be configured to recommend corrective actions based on such an analysis, such as a recommendation to upgrade or downgrade the packaging recommended for various items, to increase or decrease the damage protection provided for various items, or to modify one or more of the thresholds used to trigger specialty packaging (e.g., based on facility-specific, vendor-specific, carrier-specific, or destination-specific cost and/or damage probability data).

While the methods described above involve the comparison of shipping costs associated with an actual container to those expected when using a recommended container, a similar analysis may be performed to compare shipping costs associated with an actual container to those expected when using an ideally sized container for an item package. For example, an ideal container may be one having the same interior dimensions as that of a three-dimensional bounding box having sufficient length, width, and height to contain all of the items in the item package. The operations illustrated in FIG. 11 may be applied to this ideal container, rather than a recommended container chosen from available containers in the facility to determine excess shipping costs associated with not having an ideally sized container for the item package. Similarly, the operations illustrated in FIG. 12 may be applied to report generation for the analysis of the excess shipping costs associated with the current suite of available containers. For example, a user may request a report summarizing the excess shipping costs associated with item packages packed in one or more containers in a specified size range, as compared to the expected shipping costs if the item packages had been packed and shipped in ideal container sizes for the item packages.

In some embodiments, the package performance analyzer may be configured to recommend a corrective action that includes a determination of a more cost-effective suite of containers for a typical distribution of item packages packed and shipped at the facility. For example, the recommended corrective action may include adding one or more container types (e.g., specialty packaging types and/or corresponding protective packaging materials) to those available for shipping item packages in the materials handling facility or removing one or more container types from the available containers for shipping item packages (e.g., those too often implicated in damage to items during shipping), in different embodiments. In another example, the recommended corrective action may include recommending a different mix in the number of each container type to be stocked in the materials handling facility (e.g., on as as-needed or ongoing basis.) The package performance analyzer may in some embodiments also be configured to determine trade-offs between shipping cost improvements and productivity when making recommendations. For example, the most cost-effective system may include enough different container sizes so that each item package may be packed and shipped in an ideally sized container. However, this would be a highly inefficient situation for the packing station. The cost associated with the extra time needed to select the correct container for each item package or to divide the packing operation up into stations that pack a given range of item package sizes into their ideally sized containers may more than make up the difference in the transportation and/or materials cost saving. Therefore, the packing performance analyzer may be configured to determine the impact (in terms of cost) of any productivity losses or gains when evaluating package performance issues and recommending corrective action. If the corrective action is more expensive than the excess shipping costs, it may not be recommended.

A comprehensive packaging information system, as described herein, may be implemented in one or more software modules executing on one or more nodes of a computing system or using any combination of hardware and software components of a computing system, in various embodiments. In such embodiments, item and container dimension values and other item parameter values may be stored in one or more tables, databases, or other data structures maintained on one or more computing system nodes within a materials handling facility and/or remote computing system nodes configured to communicate with the operations of the materials handling facility. Similarly, container recommendations and/or feedback regarding actual containers in which item packages are handled may be exchanged between one or more computing system nodes within a materials handling facility and/or remote computing system nodes configured to communicate with the operations of the materials handling facility.

As noted above, a comprehensive packaging information system may in some embodiments include a product dimension estimator and/or a product dimension correction system, either of which may be utilized in conjunction with a container recommender. In some embodiments, an automated product dimension estimator may employ a process of successive approximation to estimate the dimensions of items as the items are handled within the facility. For example, the product dimension estimator may be configured to determine the dimensions of a container, portal, or dimensionally constrained path in which an instance of a given item is handled and to determine estimated dimensions of the item dependent on dimensions of the container, portal, or path. These estimated dimensions may be used by the container recommender to determine a container that is appropriately sized for handling the item (either alone or along with other items). In some embodiments, the product dimension estimator may be configured to determine the dimensions of one or more other containers, portals, or paths in which an instance of the item is handled (e.g., containers, portals, or paths having one or more dimensions with values smaller than corresponding estimated dimensions of the given item) and to update the estimated item dimensions dependent on the dimensions of the other containers, portals, or paths.

A product dimension correction system may be configured to determine that currently stored item dimension values are inaccurate based on feedback received from various agents of the facility or from automated feedback mechanisms, and/or based on an analysis of information collected for one or more incidences of a mismatch between a recommended container and an actual container, e.g., in response to identifying incongruous item packages whose dimensions do not correspond to the currently associated item dimension values for the items in the package. For example, if a group of items fits in a container significantly smaller than a container recommended by the system or does not fit in a container recommended by the system, this may indicate that currently stored item dimension values of one or more items included in the container are not accurate. In such cases, the product dimension correction system may recommend that one or more of the items be measured, or may initiate a measurement of one or more of the items. The results of the measurement(s) may then be automatically incorporated by the system in an appropriate manner, such as by updating item dimension values to reflect one or more actual dimension values from the measurement (e.g., by replacing an initial item dimension value with a measured item dimension value, by adjusting a range of allowable values for an item dimension, by adjusting the confidence level or uncertainty level associated with an item dimension value, etc.). The product dimension correction system may be used to detect that the item dimensions supplied by a vendor are inaccurate or that the size or shape of an item has changed, in some embodiments. In some embodiments, the system may consider a minimum, typical, or maximum allowed item dimension value of a given item when recommending a container for an item package, dependent on any environmental factors that may affect item dimension values (e.g., current temperature, humidity, altitude, etc.), and/or when different vendors supply some of the items. The product dimension correction system may consider any values within this range of values for the particular item dimension to be "correct," in some embodiments, or may correct the allowed range of values if it is determined to be inaccurate and/or unsuitable for use in recommending containers for item packages that include the given item.

Figure 13:
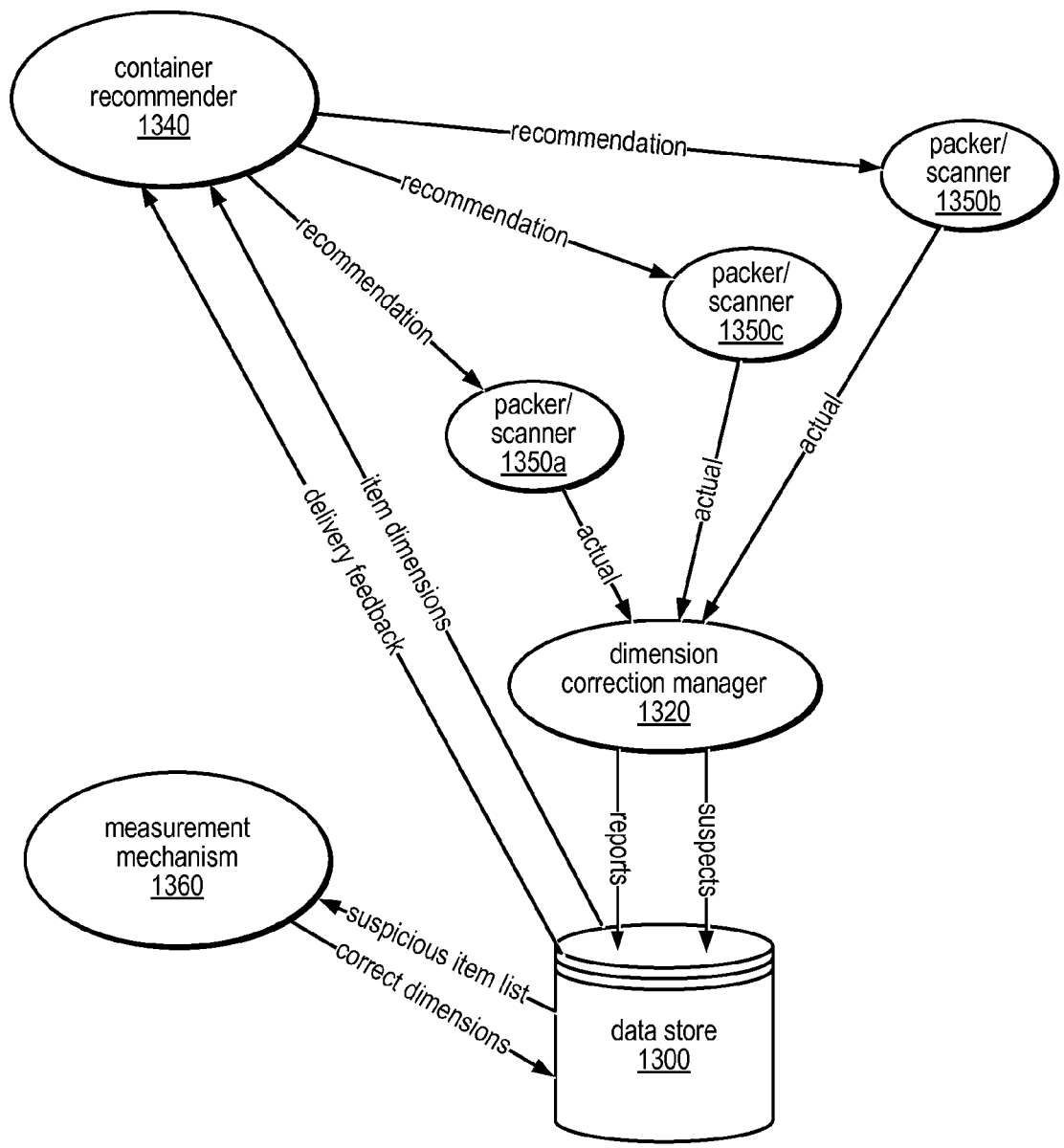
FIG. 13 illustrates a data flow diagram for a system implementing product dimension correction, according to one embodiment.

A data flow diagram for a comprehensive packaging information system, as described herein, is illustrated in FIG. 13, according to one embodiment. As illustrated in this example, the packaging information system may include various hardware and/or software components configured to carry out any or all of the operations described herein. In this example, data store 1300 may be a data store containing item parameter values for all of the items handled within a materials handling facility, including any delivery related feedback, as described herein. A container recommender 1340 may access data store 1300 to obtain currently stored item dimension values for items in an item package and/or delivery feedback (e.g., customer ratings and/or concession information for various items) and may use this information to recommend a container in which the item package may be handled, as described above.

As illustrated in FIG. 13, container recommender 1340 may provide recommendations of containers suitable for handling item packages to various packer/scanner operations 1350. For example, each of the recommendations provided to packer/scanner operations 1350a, 1350b, and 1350c may include a packing list and a recommended container for the items on the packing list. The packer/scanner operations 1350 may then provide information regarding actual containers used to handle the item packages to dimension correction manager 1320. In this example, dimension correction manager 1320 may be configured to determine if the actual container and recommended containers were the same and/or to report any differences between actual and recommended containers for item packages, which may include any costs of concessions, customer experience penalties, and/or any lost opportunity costs associated with poor customer feedback. This is illustrated as reports provided by dimension correction manager 1320 to data store 1300. In addition, dimension correction manager 1320 may be configured to provide a list of items included in item packages for which actual containers are not the same as recommended containers. This is illustrated as suspects provided by dimension correction manager 1320 to data store 1300.

In the example illustrated in FIG. 13, data store 1300 may be a data store located within the materials handling facility itself and accessed by the various operations of the facility. In this example, data store 1300 may be configured to determine which, if any, item dimension values may be inaccurate and to provide a list of items to be measured. This is illustrated as the suspicious item list provided by data store 1300 to measurement mechanism 1360.

Measurement mechanism 1360 may receive a suspicious item list from data store 1300 and may initiate measurement of the items on the list. For example, measurement mechanism 1360 may be configured to present a list of items to measure to an agent on a computer terminal display or may transmit such a list to a handheld display device or to an automated picking and/or measuring system. An agent or automated system may then measure the items on the list and provide measured item dimension information to data store 1300. This is illustrated as correct dimensions provided by measurement mechanism 1360 to data store 1300. These correct dimensions may replace inaccurate or outdated item dimension values previously stored by data store 1300 and/or may validate or raise a confidence level for item dimension values previously stored by data store 1300. These correct dimension values may then be provided to container recommender 1340 the next time the measured items are included in an item package for which a container recommendation is being made.

While the embodiment illustrated by FIG. 13 includes a dimension correction manager 1320, a container recommender 1340, and a measurement mechanism 1360 that are separate components of a system configured to perform dimension correction, in other embodiments, the functionality described as being performed by each of these components may all be performed by sub-components of a single system component, or may be partitioned in other ways. For example, in one embodiment, container recommender 1340 may be implemented as a module of a software application configured to implement dimension correction manager 1320. In another example, data store 1300 may be located in a memory of the same computing node or of a different computing node than a memory that includes program instructions configured to implement dimension correction manager 1320 and/or container recommended 1340.

In some embodiments, the packaging information system may also include a remote data store, such as a data store located at a headquarters of a company operating the materials handling facility. In some embodiments, metrics may be provided by data store 1300 to such a remote data store concerning the operations of the materials handling facility. For example, metrics may be provided indicating the number or percentage of item packages that were handled in a recommended container in a given time period, the number or percentage of item packages that were handled in a container larger or smaller than a recommended container in a given time period and/or why, the number or percentage of item dimensions that were corrected in a given time period and/or for items from a particular manufacturer or supplier, or the number of items measured and/or found to be associated with inaccurate item dimensions in a given time period. These and/or other metrics that may be extracted from data store 1300 may be analyzed and compared to similar metrics received by a remote data store from other materials handling facilities, in some embodiments. For example, these metrics may be used to identify best practices at one or more materials handling facilities. In another embodiment, corrected item dimensions may be provided to a remote data store by data store 1300 and these may be distributed to other materials handling facilities configured to exchange information with the remote data store.

Package performance analysis, as described herein, may be implemented in one or more software modules executing on one or more nodes of a computing system or using any combination of hardware and software components of a computing system, in various embodiments. Item and container cost and parameter values (e.g., dimensions and/or weight) may be stored in one or more tables, databases, or other data structures maintained on one or more computing system nodes within a materials handling facility and/or remote computing system nodes configured to communicate with the operations of the materials handling facility. Similarly, packaging-related information and/or feedback regarding actual containers in which item packages are handled may be exchanged between one or more computing system nodes within a materials handling facility and/or remote computing system nodes configured to communicate with the operations of the materials handling facility.

In some embodiments, a packaging information system may include a shipment splitting analyzer configured to facilitate packing and shipping operations by determining if and how a given group of items should be split into multiple groups of items for shipping. A shipment splitting analyzer may be configured to work together with a box recommender and/or package performance analyzer to facilitate packing and shipping operations or may be configured to work independent of a box recommender or package performance analyzer, in different embodiments.

The shipment splitting analyzer may in various embodiments be configured to analyze whether (and how) to split an item package into multiple shipment sets according to different fixed or configurable parameters available to it and/or according to policies of the materials handling facility. For example, the shipment splitting analyzer may in some embodiments take into consideration design and/or safety constraints of a target facility, such as the capacity of conveyor belts or chutes in the facility or in a particular process path thereof (e.g., to avoid backups), the largest size box that can be safely used at the facility, or the maximum allowed weight of a box that can be handled by the sorting equipment in the facility or in a particular process path thereof (e.g., 25 pounds). In some embodiments, the shipment splitting analyzer may take into consideration that some of the items in an item package may have a relationship that recommends or requires them to be shipped together. For example, a policy may specify that a cellular phone and its service plan details (e.g., documentation and/or authorization information) must be shipped together. In some embodiments, an item package that includes items with such relationships may not be split at all, while in other embodiments the shipment splitting analyzer may split such item packages, but may be configured to ensure that the related items are included in a same shipment set (e.g., by representing two or more related items with a single virtual item identifier).

In some embodiments, the items in such an item package may be split into multiple shipment sets according to category, product line, affinity (e.g., so that fragile items are grouped together and/or separately from heavy and/or bulky items; or so that items that are required to be shipped together are grouped together), or according to other parameters (e.g., volume, largest dimension, weight, or whether they will be gift wrapped), and placed in an item pool (queue) for assignment to a shipment set. In some embodiments, items designated for special damage protection (e.g., by a specialty packaging service) may be assigned to one or more shipment sets for items so designated, while items that are not designated for special damage protection may be assigned to one or more other shipment sets. Once shipment sets have been determined, pick lists for each of those shipment sets may be provided to the system and appropriate containers may be recommended for each of the shipment sets, using any or all of the methods described herein. As previously noted, different shipment sets may be routed to particular process paths within a materials handling facility after picking or sorting, based in part on availability of the recommended container and/or protective packaging materials expected to be used to package the shipment sets for shipping.

Figure 14:
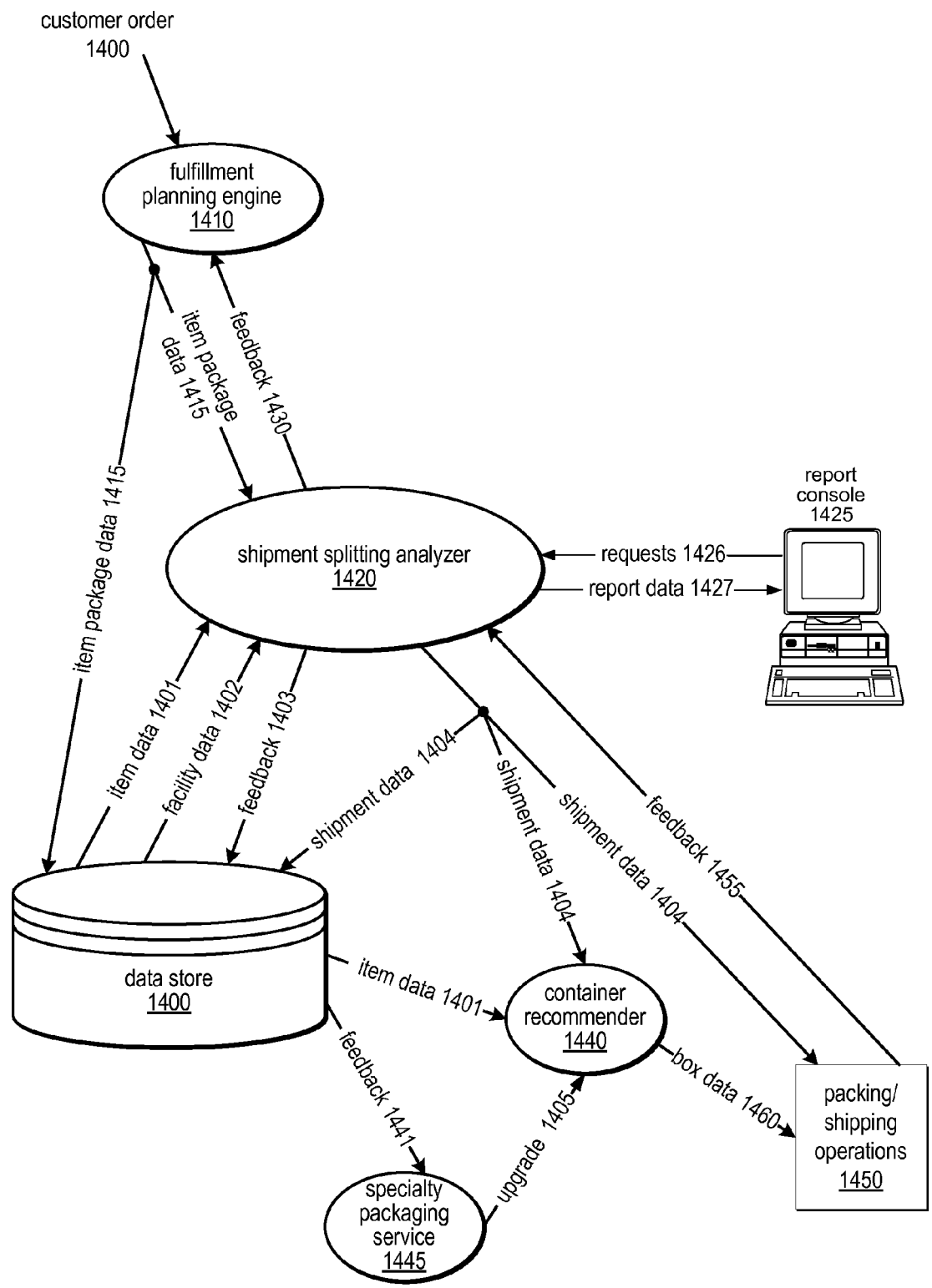
FIG. 14 illustrates a data flow diagram for a system implementing shipment splitting, according to one embodiment.

As discussed above, in some embodiments a shipment splitting analyzer may be a component of a comprehensive packaging information system in a materials handling facility. FIG. 14 illustrates a data flow diagram for a packaging information system that includes a shipment splitting analyzer, according to one embodiment. The packaging information system may include various hardware and/or software components configured to carry out the operations described herein as part of shipment splitting analysis, container recommendation, and/or package performance analysis. In this example, data store 1400 may be a data store containing item parameter values (e.g., item dimension and weight values) for all of the items handled within a materials handling facility and may also contain container parameter values (e.g., container dimensions, weight, and/or capacity information for each type of container used within the facility). Data store 1400 may be a data store located within the materials handling facility itself and accessed by the various operations of the facility or may be a remote data store accessed by various operation of the facility via a network over which they are connected.

As illustrated in FIG. 14, a packaging information system may in some embodiments include an upstream fulfillment planning engine 1410, configured to determine the facility or facilities to which an item package or complete customer order should be directed. As described above, a fulfillment planning engine 1410 may in some embodiments be configured to determine whether or not a single fulfillment facility is able to provide all of the items in an order, and may pass subsets of a customer order to the smallest number of fulfillment facilities that may supply the required items. In other embodiments, fulfillment planning engine 1410 may be configured to divide a customer order into multiple item packages dependent on other parameters, including, but not limited to, a service level agreement, the location of one or more facilities with respect to a destination, customer and/or order priorities (e.g., premium customer service or premium shipping considerations), specialty transportation service availability, or specialty services capability (e.g., gift wrapping or export services).

Fulfillment planning engine 1410 may provide item package data 1415 for a customer order (which may include multiple item packages making up a customer order), to one or more shipment splitting analyzers 1420 (e.g., to a shipment splitting analyzer 1420 in each of two or more target facility or to one or more centrally located shipment splitting analyzers 1420 on behalf of one or more target facilities). In some embodiments, shipment splitting analyzer 1420 may provide feedback 1430 to fulfillment planning engine 1410 (e.g., feedback indicating the results of shipment splitting analysis, the configuration of a target facility, the capabilities and available services of a target facility, the available containers of a target facility, etc.). In some embodiments, this feedback may be used to analyze packaging performance of the facility or of the overall inventory management organization (not shown). In the example illustrated in FIG. 14, fulfillment planning engine 1410 may also provide item package data 1415 to data store 1400 for storage and/or future analysis.

In the example illustrated in FIG. 14, shipment splitting analyzer 1420 may obtain item data 1401 and facility data 1402 from data store 1400. Item data 1401 may include dimension information, weight information, affinity and/or relationship information, or category information associated with each item in an item package, in various embodiments. Facility data 1402 may include facility configuration, capability, or constraint information; available container information; dimension, weight or capacity information for available containers; and/or information about services available at the target facility. As described above, any or all of item data 1401 and/or facility data 1402 may be used by the shipment splitting analyzer 1420 to determine if and how an item package should be split into multiple shipment sets. In some embodiments, shipment splitting analyzer 1420 may provide feedback 1403 to data store 1400 for storage and/or future analysis. For example, in some embodiments, information indicating if and/or how an item package was split (e.g., by what parameter(s) it was sorted, the target container used in the splitting algorithm, or the number of iterations attempted before it was split or the attempt to split it was abandoned). This information may in some embodiments be analyzed by the shipment splitting analyzer or packaging information system later to produce reports and/or to determine trends in the operation of the materials handling facility and/or the shipment splitting analysis, as described herein.

In the example illustrated in FIG. 14, shipment splitting analyzer 1420 may output shipment data 1404, which may include a list of item identifiers for items included each shipment set and quantities associated with each item identifier in each shipment set, as described above. Shipment data 1404 may in various embodiments be provided to data store 1400 (e.g., for storage and/or future analysis), a container recommended 1440, and/or directly to packing/shipping operations 1450 in the target facility for a given item package. For example, in some embodiments, a stand-alone container recommender 1440 may be invoked by the system subsequent to determining the shipment set(s) making up an item package, and may provide box data 1460 associated with each shipment set to packing/shipping operations 1450. In other embodiments, a container recommender (e.g., a software module similar to a stand-alone container recommender 1440) may be invoked by shipment splitting analyzer 1420 as part of its analysis, and box data (similar to box data 1460) may be provided to packing/shipping operations 1450 by shipment splitting analyzer 1420 as part of shipment data 1404.

In some embodiments, container recommender 1440 may call (or otherwise be utilized in conjunction with) a specialty packaging service 1445. Specialty packaging service 1445 may receive delivery feedback 1441 (e.g., from data store 1400), which may include customer feedback information and/or concession information about one or more item deliveries. Specialty packaging service 1445 may in some embodiments analyze this information and provide an indication of any packaging upgrades 1405 recommended for shipping a given item or group of items to container recommender 1440. For example, if specialty packaging service 1445 determines that a given item should be designated for special damage protection, upgrades 1405 may indicate that one or more container types should be excluded from consideration by container recommender 1440, may indicate a recommended container for shipping the item, may indicate that protective packaging materials should be used in preparing the item for shipment, and/or may indicate that the item should be added to a list of items designated for special packaging, in different embodiments.

Note that shipment data 1404 may be provided to packing/shipping operations 1450 on an input/output device readable by an agent working in the materials handling facility, in some embodiments. In other embodiments, shipment data 1404 may be printed for an agent, such as on a pick list or packing list. In still other embodiments, a machine may be configured to pick and/or present a recommended container (such as a box) to an agent or to an automated packing system and/or to automatically transport the items in a given shipment set to a portal, path, or packing station (e.g., one suitable for handling containers having a particular range of dimensions and/or weight capacity) for packing. In some embodiments, an automated sorting system may be configured to transport packed shipment set(s) to an appropriate loading area and/or chute to a loading area for "just in time" shipping. Note also that packing/shipping operations 1450 may provide feedback 1455 to shipment splitting analyzer 1420 (e.g., feedback an actual container used for each shipment set, the configuration of a target facility, the capabilities and available services of a target facility, the available containers of a target facility, etc.). Feedback from packing/shipping operations 1450 may be received from an agent (e.g., as data entered by an agent on a terminal or other communication device), in some embodiments, or from an automated feedback mechanism of various operations of the materials handling facility.

As illustrated in FIG. 14, a shipment splitting analyzer may in some embodiments be configured to provide report data 1427 in response to one or more requests 1426. In this example, report console 1425 may include a web browser through which a user may request various reports and on which these reports may be displayed. For example, a browser window may display a web page, which may be configured as an interface for requesting and/or receiving package performance reports. In some embodiments, the web page may include three input/output fields: a report type selection field, a report parameters selection field, and report display field, although any number and type of input/output fields may be displayed in such an interface. In some embodiments, a user may specify one or more reports to be generated by selecting one or more items on a pull-down menu or radio buttons, in different embodiments. Depending on the package performance report(s) selected, the user may be prompted to enter values or a value range for any configurable parameters of the report(s), e.g., a date or date range, or a facility, site, or packing station for which the report should be generated. The user may also be able to specify a report format from a menu, radio buttons, or by other input means. For example, the user may specify that a report should be presented in a tabular format, sorted by date, or as a histogram, with agent identifiers on the primary axis. In another example, the user may specify that a report should be presented to the user by displaying it on the report console and/or that it should be printed, emailed to one or more other users (e.g., managers), or stored in the data store. In some embodiments, a user may select an option from a pull-down menu or a series of radio buttons to specify a schedule for automatically generated reports, e.g., specifying that the requested reports should be generated daily, weekly, or after each shift.

In this example, a user may request one or more reports regarding the number or percentage of item packages split into multiple shipment sets, the number or average number of items in each shipment set, the number or percentage of item packages requiring exception handling for shipment splitting, the number or percentage of item packages shipped as whole or partial palettes, or the performance of the overall packaging operation in terms of speed, rework, or meeting transportation schedules with packed shipment sets ready "just in time". In some embodiments, trends of each of these metrics may be reported and/or analyzed in order to identify opportunities to improve the shipment splitting algorithm and/or the configuration of a given materials handling facility. For example, if one of these metrics changes by a given percentage (up or down), the shipment splitting analyzer may be configured to flag the change and/or to trigger a review of the performance of the packaging information system or the operation of a given facility.

While the embodiment illustrated by FIG. 14 includes a fulfillment planning engine 1410, a shipment splitting analyzer 1420, and a container recommender 1440 that are separate components of a system configured to manage packing/shipping operations in a materials handling facility on behalf of an order fulfillment operation, in other embodiments, the functionality described as being performed by each of these components may all be performed by sub-components of a single system component, or may be partitioned in other ways. For example, in one embodiment, container recommender 1440 may be implemented as a module of a software application configured to implement shipment splitting analyzer 1420. In another example, data store 1400 may be located in a memory of the same computing node or of a different computing node than a memory that includes program instructions configured to implement a packaging information system, fulfillment planning engine 1410, shipment splitting analyzer 1420 and/or container recommended 1440. In some embodiments, the packaging information system In some embodiments, the packaging information system may also include a remote data store, such as a data store located at a headquarters of a company operating the materials handling facility. In some embodiments, metrics may be provided by data store 1400 to such a remote data store concerning the operations of the materials handling facility. These metrics may include shipment data 1404, container usage data, report data 1427, and other data collected and/or collated by the packaging information system. Metrics that may be extracted from data store 1400 may be analyzed and compared to similar metrics received by a remote data store from other materials handling facilities, in some embodiments. For example, these metrics may be used to identify best practices at one or more materials handling facilities. In another embodiment, information may be provided to a remote data store by data store 1400 and may be distributed to other materials handling facilities configured to exchange information with the remote data store.

Figure 15:
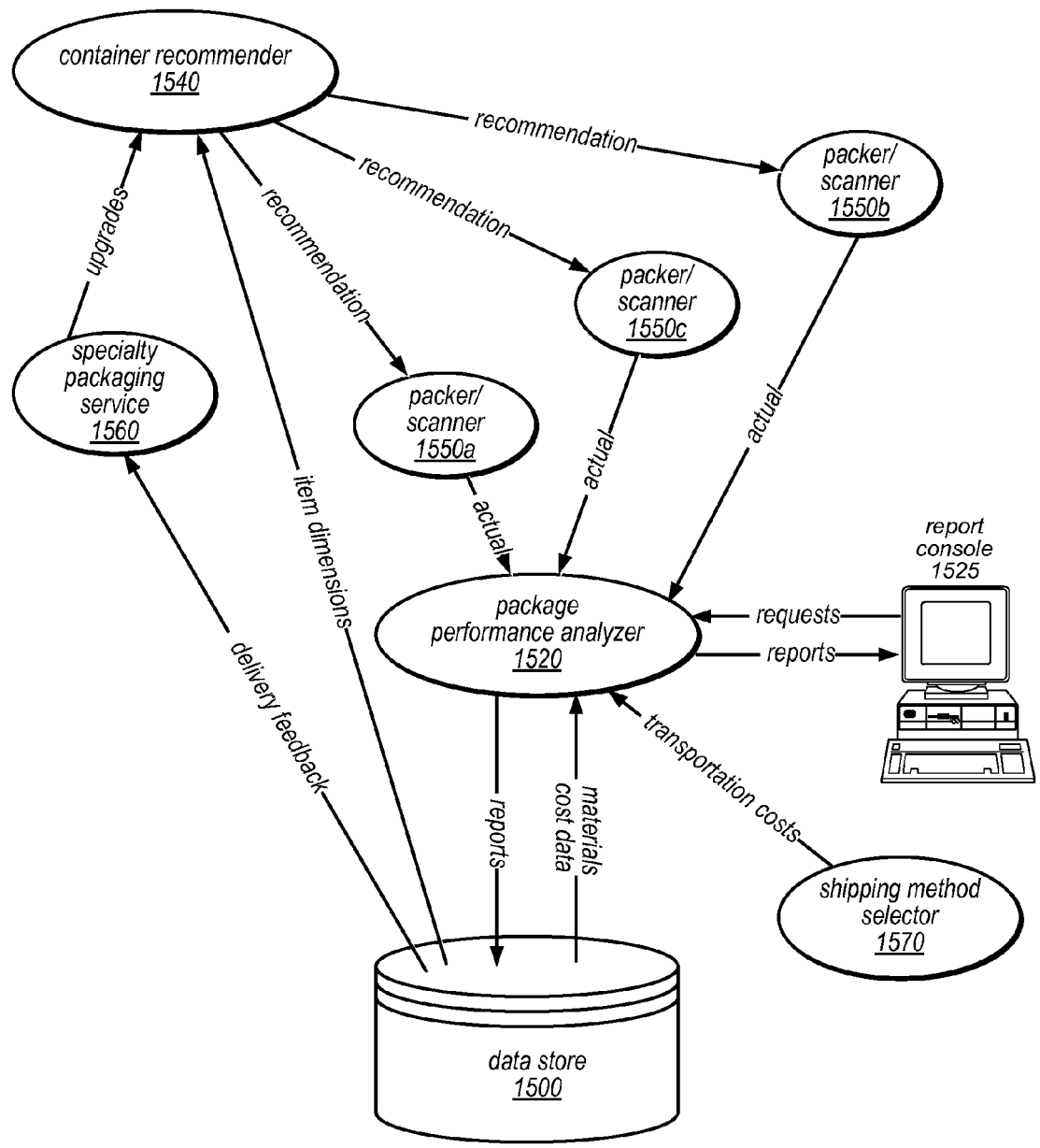
FIG. 15 illustrates a data flow diagram for a system implementing package performance analysis, according to one embodiment.

A data flow diagram for a package performance analysis system, as described herein, is illustrated in FIG. 15 according to one embodiment. The package performance analysis system may include various hardware and/or software components configured to carry out the operations described herein as part of package performance analysis. In this example, data store 1500 may be a data store containing item parameter values for all of the items handled within a materials handling facility. A container recommender 1540, which may be configured to work together with (or include) specialty packaging service 1560, may access data store 1500 to obtain currently stored item dimension values for items in an item package and may use this information to recommend a container in which the item package may be handled, as described above. In various embodiments, data store 1500 and/or container recommender 1540 may be the same as the corresponding components illustrated in FIGS. 13 and 14, or they may be similar, but separate components.

As illustrated in FIG. 15, container recommender 1540 may provide recommendations of containers suitable for handling item packages to various packer/scanner operations 1550. In some embodiments, specialty packaging service 1560 may analyze delivery related feedback and may recommend various packaging upgrades (e.g., specialty packaging) based on that delivery related feedback, as described herein. For example, specialty packaging service 1560 may obtain data representing customer ratings and/or concession information from data store 1500, and may provide recommendations for packaging upgrades (e.g., by excluding one or more containers from consideration or by directing the selection of a more suitable container, one with increased protection for items) to container recommender 1540.

As in previous examples, each of the recommendations provided to packer/scanner operations 1550a, 1550b, and 1550c may include a packing list and a recommended container for the items on the packing list. The packer/scanner operations 1550 may then provide information regarding actual containers used to handle the item packages to dimension correction manager 1520. Packer/scanner operations 1550a, 1550b, and 1550c may in various embodiments represent the same operations as the corresponding components illustrated in FIG. 13, or they may be similar, but separate components.

In this example, package performance analyzer 1520 may be configured to determine if the shipping cost associated with an actual container and a recommended container are the same and/or to report any differences between actual and recommended containers and/or shipping costs for item packages (including any concessions costs, customer experience penalties, and/or lost opportunity costs resulting from items being damaged during shipping). This is illustrated as reports provided by package performance analyzer 1520 to data store 1500. In addition, package performance analyzer 1520 may be configured to provide other packaging-related information to data store 1500, such as feedback received from one of packer/scanner operations 1550 regarding the use of a container other than a recommended container. Package performance analyzer 1520 may also be configured to obtain packaging-related information from data store 1550, such as shipping materials costs, item and shipping material dimensions and/or weights, etc.

In the example illustrated in FIG. 15, package performance analyzer 1520 may be configured to receive transportation cost information from shipping method selector 1540. For example, shipping method selector 1540 may be configured to determine expected transportation costs for an item package packed and shipped in a recommended container and/or actual transportation costs for an item package packed in an actual container, as described above.

Package performance analyzer 1520 may in some embodiments be configured to receive request for reports via report console 1525 and to provide the requested reports on console 1525. For example, report console 1525 may include a web browser through which a user may request various package performance reports and on which these reports may be displayed. Various example package performance reports are described below.

Figure 16:
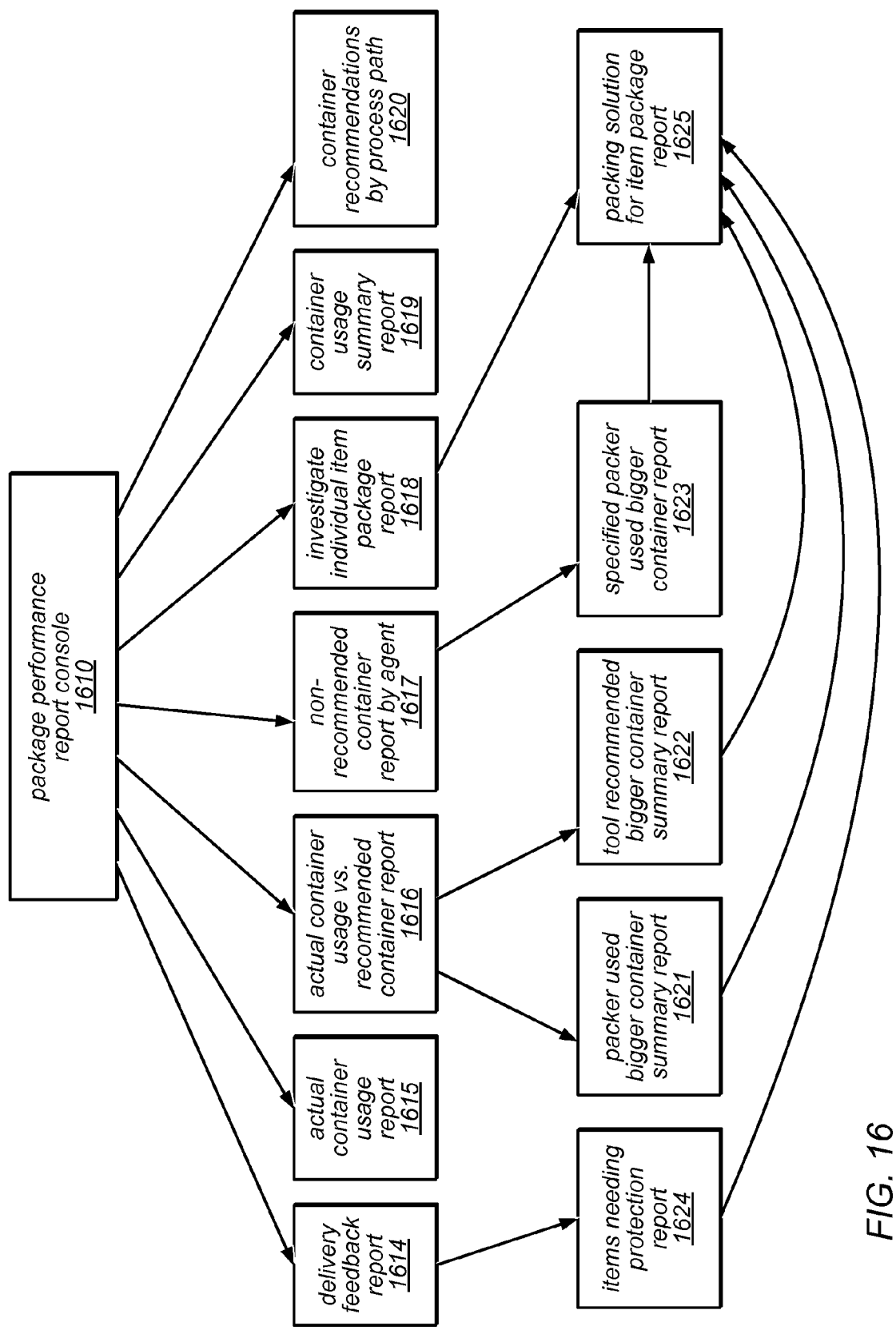
FIG. 16 illustrates a series of package performance reports, according to one embodiment.

FIG. 16 illustrates a series of package performance reports that may be generated via package performance report console 1610. As previously described, such a report console may provide a web browser interface or other suitable user interface for users requesting package performance reports and entering report parameters. In this example, seven primary package performance reports (1614-1620) are illustrated, as well as four derivative reports (1621-1625). As used herein, the terms "primary report" may refer to a standard package performance report or an initial report requested by a user, in different embodiments. The term "derivative report" may refer to a report generated from data included in a primary report, e.g., by further sorting the report data or drilling down on a report entry. The package performance reports illustrated in FIG. 16 are merely examples and are not meant to be limiting on the types or number of reports that may be generated by the package performance analyzer.

In the example illustrated in FIG. 16, a delivery feedback report 1614 may be generated. This report may include one or more tables or graphs depicting the ratings received by customers related to damage of a given item (i.e. items having a single item identifier) and/or the use of appropriate containers for shipping the item, or any concessions related to the item being damaged during shipping, in some embodiments. The report may in some embodiments include identifiers of various item packages that included the item along with the actual container used to ship the item. In some embodiments, the report may also include other relevant packaging-related information, such as an identifier of an agent or packing station responsible for packing each of the item packages, and/or the value of a damage protection parameter associated with the item. The entries in the report may be sorted and/or displayed by date, agent, container type, or any other suitable parameter specified in the report request or included as a default parameter value. In some embodiments, the entries may represent aggregated data, such as a total cost of concessions customer experience penalties, and/or lost opportunity costs for the item over a given time period, or an average customer rating over a given time period, for example.

In the example illustrated in FIG. 16, an actual container usage report 1615 may be generated. This report may include a table or graph depicting the number and/or percentage of containers (e.g., boxes) used to ship item packages, in some embodiments. The report may in some embodiments include identifiers of each item package along with the actual container used. In some embodiments, the report may also include other relevant packaging-related information, such as an identifier of an agent or packing station responsible for packing the item package. The entries in the report may be sorted and/or displayed by date, agent, container type, or any other suitable parameter specified in the report request or included as a default parameter value. In some embodiments, the entries may represent aggregated data, such as a total or average number of containers per day or per location, for example.

An actual container vs. recommended container report 1616 is also illustrated in FIG. 16. This report may in some embodiments include a table or graph depicting a comparison between the number or percentage of each actual containers type used and the number or percentage of recommended container types used. For example, each entry in this report may include an identifier of a container type, the number of times the container was recommended, and the number of times the container was used. In various embodiments, each entry in this report may also include item package identifiers, dates, or other relevant packaging-related information, and may be sorted and/or displayed by date, agent, container type, or any other suitable parameter specified in the report request or included as a default parameter value. In some embodiments, the entries may represent aggregated data, such as a total or average number of containers used vs. recommended per day or per location, for example.

FIG. 16 also illustrates a non-recommended container report by agent 1617. This report may in some embodiments include a table or graph illustrating the number or percentage of item packages for which a recommended container was not used, sorted by individual agents. For example, each entry in the report may include an identifier of an agent, a number of larger than recommended containers used, a percentage of larger than recommended containers used, a number of smaller than recommended containers used, a percentage of smaller than recommended containers used, a cumulative excess cost associated with larger than recommended containers, a cumulative cost associated with smaller than recommended containers, or any other relevant packaging-related information. In some embodiments, the data in this report may be sorted and/or displayed by date, by site, by agent, or by any other suitable parameter specified in the report request or included as a default parameter value. For example, in one embodiment, the data in this report may be sorted by an identifier of the manager of each agent, and the report may be provided to the manager in order for him or her to determine if an agent requires additional training.

An "investigate individual item package" report 1618 is illustrated in FIG. 16. This report may in some embodiments include all stored information related to the packaging and shipping of a given item package. For example, it may include a date, a time, an identifier of a packing station, an identifier of the responsible packing agent, an identifier of a recommended container, an identifier of the actual container, expected shipping costs, actual shipping costs, a list of the items included in the item package, a list of any non-item contents included in the container, or any other relevant information.

As illustrated in FIG. 16, the package performance analyzer may in some embodiments be configured to generate an avoidable shipping cost summary report 1619. Each entry in this report may in some embodiments include a date, an avoidable transportation cost (i.e., the excess cost resulting from use of a non-recommended container), an avoidable consumables cost (i.e., the excess cost of shipping materials), a total avoidable shipping cost, a count of avoidable container selections, a percentage of avoidable container selections, and a percentage of shipping costs that are avoidable.

The last primary package performance report illustrated in FIG. 16 is a container recommendations by process path report 1620. This report may include a recommended suite of containers for one or more process paths in the materials handling facility. For example, if a high-speed automated packing machine may only handle one container type at a time, the package performance analyzer may recommend that the machine be used with the most common container type and that item packages for which the most common container type is recommended be directed to that packing line. Similarly, if a particular packing station is located in a smaller than average area in the facility, the package performance analyzer may recommend that only the smallest container types be used at the packing station and that item packages for which these container types are recommended be directed to that packing line.

As noted above, FIG. 16 illustrates several derivative package performance reports. For example, report 1624 may be derived from data included in multiple primary reports 1614 (delivery feedback reports). Report 1624 may include a listing of items for which analysis of the corresponding delivery feedback report 1614 indicates that the item should be designated as needing special damage protection due to a history of actual damage, concessions due to actual or perceived damage, and/or unsatisfactory customer feedback. In some embodiments, report 1624 may include a cumulative list of items for which such a designation is needed or currently assigned. In other embodiments, report 1624 may include a list of those items that were not designated as needing special damage protection, but that have been determined to need such a designation based on a recent delivery feedback report 1614.

Report 1621 may be derived from data included in primary report 1616 (actual container usage vs. recommended container usage report). Report 1621 includes only those entries for which an item package was packed in a bigger than recommended container, in this example. The report entries may include the same information as those described above regarding report 1616, in some embodiments, or any subset or transformation of that information, according to received report parameters. For example, the information in report 1621 may be sorted using a different parameter, a different parameter value, or a different parameter value range than that used in generating report 1616. In this example, report 1622 is similar to report 1621, but includes only those entries of report 1616 for which an item package was packed in a smaller than recommended container (i.e., the tool recommended a bigger container than may have been necessary to handle the items.)

Derivative report 1623 ("specified packer used bigger container"), in the example illustrated in FIG. 16, may be derived from information included in primary report 1617 ("non-recommended container report by agent"). This information in each entry of derivative report 1623 may be the same as that in the entries of report 1617, or may be a subset or a transformation of the information in report 1617, in various embodiments.

As illustrated in FIG. 16, a packing solution for item package report 1625 may be derived from any of reports 1621, 1622, 1623, 1624, and 1618, in this example. This report may be generated by drilling down on an entry included in one of these reports to identify a particular item package. The report may in some embodiments display a recommended packing algorithm and/or placement for packing the items included in the item package in a container of the recommended container type or a modified container recommendation for the item package. Such a report may in some embodiments be used for training purposes, such as to illustrate to an agent a preferred container (e.g., one that better protects items such as those in this item package) and/or the preferred method for packing containers such that the most cost-effective containers may be used, as recommended.

As noted above, the package performance analyzer may be configured to generate other types of reports not illustrated in FIG. 16. In one embodiment, it may be configured to generate a graph or chart illustrating the number or percentage of container mismatches due to each of a number of different reasons for the mismatch. For example, the package performance analyzer may be configured to generate a pie chart illustrating the percentage of container mismatches or the excess shipping costs due to agent error (e.g., as determined by the analyzer), the recommended container not being available (e.g., as determined from feedback received), item damage during shipping (e.g., due to inadequate protection), or item dimensions in the data store being incorrect for one or more items in the item packages.

As previously noted, the product dimension estimator, product dimension correction manager, shipment splitting analyzer, container recommender, specialty packaging service, inventory management system, and/or package performance analyzer described herein may be components of a comprehensive packaging information system. Such a system may include additional components configured to provide other functionality to various operations in the materials handling facility. For example, the service may include any or all of the following:

- a box forecasting service, configured to generate a report specifying what containers (e.g., boxes) to erect, and when to erect them, so that they are delivered to shipment assembly at the same time as the items.
- a package type recommender, configured to recommend a packaging type based on shipment weight or product types to reduce damage in shipping. For example, stronger corrugate may be recommended for heavier product or a fragile item may be directed to a box rather than a folder.
- a shipping method recommender, configured to assign shipment methods dependent on box type availability and the resulting cost of shipment.
- a filler recommender, configured to recommend a number of air bags for a container, for example.
- an inbound prepping service, configured to use a container recommendation for prepping of inbound items.
- a packaging system flow analyzer, configured to display a tradeoff in packaging choice versus productivity in real time. For example, if a package choice is optimum, but a corresponding productivity impact negates savings, the analyzer may recommend a choice to be made.
- an automated inventory cycle counter, configured to decrement consumables used in packing/shipping operations. This may reduce manual cycle count errors, and account for wastage.
- a financial analyzer, configured to offer comparison data for supplies cost from container usage reports to manual cycle count usage data.
- a new merchant shipping cost forecaster, configured to determine a real shipping cost impact of new merchant integration to replace fixed estimates.
- a customer container advisor, configured to determine the number of boxes a customer should expect for an order and to display this at checkout.
- a process path recommender, configured to direct particular item packages to process paths in which recommended containers are available.

Figure 17:
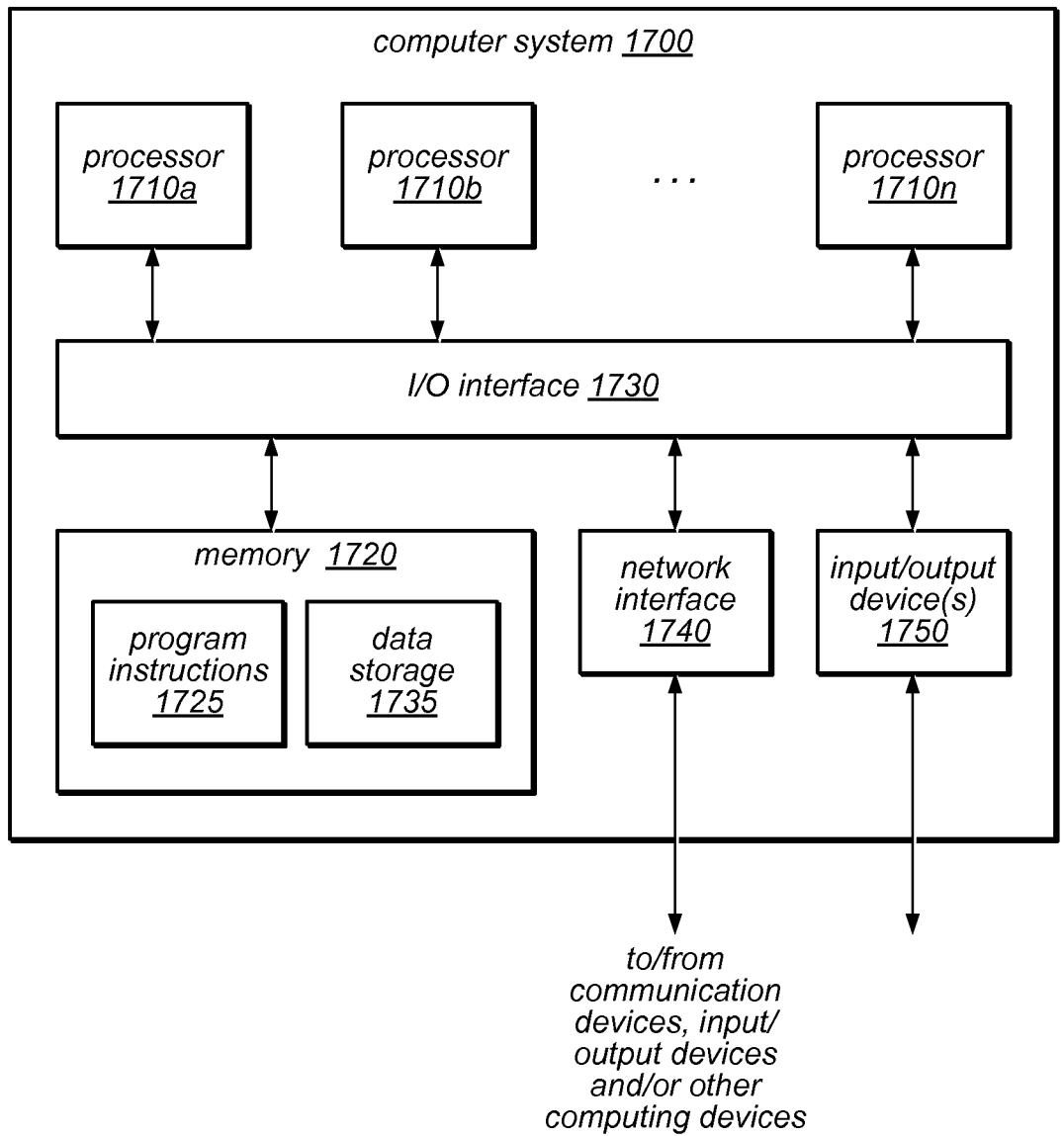
FIG. 17 is a block diagram illustrating an example computer system configured to implement one or more of the packaging related operations described herein, according to one embodiment.

Various operations of a comprehensive packaging information system, such as those described herein, may be executed on one or more computer systems, interacting with various other devices in a materials handling facility, according to various embodiments. One such computer system is illustrated by the block diagram in FIG. 17. In the illustrated embodiment, computer system 1700 includes one or more processors 1710 coupled to a system memory 1720 via an input/output (I/O) interface 1730. Computer system 1700 further includes a network interface 1740 coupled to I/O interface 1730, and one or more input/output devices 1750. In some embodiments, it is contemplated that a comprehensive packaging information system may be implemented using a single instance of computer system 1700, while in other embodiments multiple such systems, or multiple nodes making up computer system 1700, may be configured to host different portions or instances of a comprehensive packaging information system. For example, in one embodiment some data sources or services (e.g., capturing actual container information) may be implemented via one or more nodes of computer system 1700 that are distinct from those nodes implementing other data sources or services (e.g., recommending a container for an item package). In some embodiments, a given node may implement the functionality of more than one component of a comprehensive packaging information system.

In various embodiments computer system 1700 may be a uniprocessor system including one processor 1710, or a multiprocessor system including several processors 1710 (e.g., two, four, eight, or another suitable number). Processors 1710 may be any suitable processor capable of executing instructions. For example, in various embodiments processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA.

System memory 1720 may be configured to store program instructions and/or data accessible by processor 1710. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1720 as program instructions 1725 and data storage 1735, respectively. In other embodiments, program instructions and/or data may be received, sent or stored upon different types of computer-accessible media, such as non-transitory media, or on similar media separate from system memory 1720 or computer system 1700. Generally speaking, a non-transitory, computer-accessible medium may include storage media or memory media such as magnetic or optical media, e.g., disk or CD/DVD-ROM coupled to computer system 1700 via I/O interface 1730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1740.

In one embodiment, I/O interface 1730 may be configured to coordinate I/O traffic between processor 1710, system memory 1720, and any peripheral devices in the device, including network interface 1740 or other peripheral interfaces, such as input/output devices 1750. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices attached to a network, such as other computer systems, or between nodes of computer system 1700. For example, in one embodiment a measurement mechanism, such as measurement mechanism 1360 described above, may be configured to communicate with computer system 1700 via network interface 1740. In various embodiments, network interface 1740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1750 may, in some embodiments, include one or more display terminals, keyboards, keypads, touchpads, scanning devices, voice or optical recognition devices, or any other devices suitable for entering or retrieving data by one or more computer systems 1700. Multiple input/output devices 1750 may be present in computer system 1700 or may be distributed on various nodes of computer system 1700. In some embodiments, similar input/output devices may be separate from computer system 1700 and may interact with one or more nodes of computer system 1700 through a wired or wireless connection, such as over network interface 1740.

As shown in FIG. 12, memory 1720 may include program instructions 1725, which may be configured to implement a comprehensive packaging information system, and data storage 1735, which may comprise various tables, databases and/or other data structures accessible by program instructions 1725. In one embodiment, program instructions 1725 may include various software modules configured to implement a product dimension estimator, a product dimension correction system, a predictive router, a shipment splitting analyzer, a container recommender (which may include or make use of a specialty packaging service), a fulfillment planning engine, and/or a package performance analyzer. Data storage 1735 may include various data stores for maintaining one or more protected item lists, data representing physical characteristics of items and/or other item parameter values (such as those illustrated as being stored in Table 1), container parameter values (such as those illustrated as being stored in Table 2), item package information (such as that illustrated as being stored in Table 3), shipping reports (not shown), actual or expected shipping costs, avoidable shipping costs, package performance reports (e.g., reports 1614-1625), etc. Data storage 1735 may also include one or more data stores for maintaining data representing delivery related feedback, such as customer ratings, customer experience penalties, lost opportunity costs, information about concession incidents, and/or concessions costs.

In various embodiments, the parameter values and other data illustrated herein as being included in one or more data stores may be combined with other information not described or may be partitioned differently into more, fewer, or different data structures. In some embodiments, data stores used in a comprehensive packaging information system, or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may make up a comprehensive packaging information system and/or any of the various components thereof described herein.

Users may interact with the packaging information system (and/or various components thereof) in various ways in different embodiments, such as to automatically measure and/or manually specify measured dimension values for items and/or packaging, to specify and/or modify thresholds to be used when determining suspect item dimensions, or to specify package performance reports to be generated and/or report parameters. For example, some users may have physical access to computing system 1700, and if so may interact with various input/output devices 1750 (e.g., report console 1610) to provide and/or receive information. Alternatively, other users may use client computing systems to access the packaging information system and/or its constituent components, such as remotely via network interface 1740 (e.g., via the Internet and/or the World Wide Web). In addition, some or all of the packaging information system components may provide various feedback or other general types of information to users (e.g., in response to user requests) via one or more input/output devices 1750.

Those skilled in the art will appreciate that computing system 1700 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing system 1700 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the techniques described herein may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners.

Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as illustrated in the figures and described herein represent example embodiments of methods. The methods may be implemented in software, in hardware, or in a combination thereof in other embodiments. Similarly, the order of any method may be changed, and various elements may be added, reordered, combined, omitted, modified, etc., in other embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   performing, by a hardware computer system:
      receiving an identifier of an item, the item to be shipped from a materials handling facility in response to an order received by an entity;
      determining, by a container recommendation service, three or more candidate containers for shipping the item, dependent on physical dimension values associated with the item;
      accessing, by a specialty packaging service, data indicating whether the item is designated as needing special damage protection, wherein the item designation is based at least in part on delivery-related feedback received by the entity from one or more recipients of one or more previous shipments of the item;
      in response to determining that the item is designated as needing special damage protection, excluding, by the specialty packaging service, one or more of the three or more candidate containers from consideration, wherein said excluding leaves at least two candidate containers for consideration;
      selecting, by the container recommendation service, a recommended container in which to ship the item from among the two or more candidate containers other than the one or more excluded containers; and
      transmitting an instruction to a machine that either directs the machine to route the item to a particular packing station supporting the recommended container or directs the machine to pick or present at least the recommended container for packing the item.

2. The method of claim 1, wherein the feedback comprises one or more of: a customer rating of a suitability of a container in which the item was shipped, a customer rating of a condition of the item when it was received, a customer experience penalty, a lost opportunity cost, an indication of a concession incident, or a cost associated with a concession incident.

3. The method of claim 1, further comprising returning an indication that protective packaging materials should be used when preparing the item for shipping in the recommended container.

4. The method of claim 1, wherein the data indicating whether the item is designated as needing special damage protection comprises a collection of identifiers of items designated as needing special damage protection.

5. A computing system, comprising:
   one or more hardware processors; and
   one or more modules comprising program instructions that are executed by the one or more hardware processors and cause the one or more processors to perform:
      receiving an identifier of an item, the item to be shipped in a container in response to an order received by an entity;
      accessing, by a container recommendation module, data representing physical characteristics of the item;
      accessing, by a specialty packaging service, data representing delivery-related feedback that was received by the entity from one or more recipients of one or more previous shipments of the item;
      determining a container in which to ship the item, dependent on the data representing the physical characteristics of the item and the data representing the feedback; and
      transmitting an instruction to a machine to either direct the machine to route the item to a particular packing station supporting the determined container or direct the machine to pick or present the determined container for packing the item.

6. The system of claim 5, wherein the data representing physical characteristics of the item comprises data representing one or more of: a dimension of the item, a volume of the item, or a weight of the item.

7. The system of claim 5, wherein the item is one of a plurality of items to be shipped together in the determined container.

8. The system of claim 5, wherein said determining is further dependent on one or more of: a customer to whom the item is to be shipped, a service level agreement, a destination of the item, a shipping carrier selected for shipping the item, item affinity information, an indicator of a fragility of the item, or an environmental constraint.

9. The system of claim 4, wherein the feedback comprises one or more of: a customer rating of the suitability of a container in which the item was shipped, or a customer rating of the condition of the item when it was received.

10. The system of claim 5, wherein the feedback comprises one or more of: a customer experience penalty, a lost opportunity cost, an indication of a concession incident, or a cost associated with a concession incident.

11. The system of claim 5, wherein when executed by the one or more processors, the program instructions further cause the one or more processors to perform
   determining whether the item should be designated as needing special damage protection, dependent on the data representing the feedback; and
   in response to determining that the item should be designated as needing special damage protection, storing an indication that the item is designated as needing special damage protection in association with the identifier of the item.

12. The system of claim 5, wherein said determining comprises:

determining two or more candidate containers for shipping the item, dependent on the data representing the physical characteristics of the item; and selecting a container in which to ship the item from among the two or more candidate containers, dependent on the data representing feedback.

13. A method, comprising:

performing, by a hardware computer system:

receiving feedback in response to a shipment of an item;

accessing, by a specialty packaging service, previously stored data representing delivery-related feedback that was received by an entity from one or more recipients of one or more previous shipments of the item;

determining, by the specialty packaging service, whether the item is a candidate for special damage protection, dependent on the received feedback and the previously stored data;

in response to determining that the item is a candidate for special damage protection, storing, to a data store, an indication that the item is designated as an item for which special damage protection is recommended;

selecting, by a container recommendation service, and in response to an order received by the entity, a container for a subsequent shipment of the item, dependent on the stored indication; and transmitting an instruction to a machine that either directs the machine to route the item to a particular packing station supporting the selected container or directs the machine to pick or present the selected container for packing the item.

14. The method of claim 13, wherein the feedback comprises one or more of: a customer rating of the suitability of a container in which the item was shipped, or a customer rating of the condition of the item when it was received.

15. The method of claim 13, wherein the feedback comprises one or more of: a customer experience penalty, a lost opportunity cost, an indication of a concession incident, or a cost associated with a concession incident.

16. The method of claim 13, further comprising:

storing an indication that an item similar to the item is designated as an item for which special damage protection is recommended.

17. The method of claim 13, wherein said selecting is further dependent on one or more physical characteristics of the item.

18. The method of claim 17, wherein said selecting comprises:

determining two or more candidate containers for shipping the item, dependent on the one or more physical characteristics of the item; and selecting a container in which to ship the item from among the two or more candidate containers, dependent on the stored indication.

19. The method of claim 13, wherein said selecting is further dependent on one or more of: a customer to whom the item is to be shipped, a service level agreement, a destination of the item, a shipping carrier selected for shipping the item, item affinity information, an indicator of the fragility of the item, or an environmental constraint.

20. A non-transitory, computer-readable storage medium storing program instructions that when executed on one or more hardware computers cause the one or more hardware computers to perform:

receiving an identifier of an item, the item to be shipped in a container in response to an order received by an entity;

accessing data representing physical dimensions of the item;

determining, by a container recommendation service, three or more candidate containers for shipping the item, dependent on the data representing the physical dimensions of the item;

accessing, by a specialty packaging service, data representing feedback that was received by the entity from one or more recipients of one or more previous shipments of the item;

excluding, by the specialty packaging service, one or more of the three or more candidate containers from consideration, dependent on the data representing the feedback, wherein said excluding leaves at least two candidate containers for consideration;

selecting, by the container recommendation service, a container in which to ship the item from among the at least two candidate containers other than the one or more excluded containers; and transmitting outputting an instruction to a machine that either directs the machine to route the item to a particular packing station supporting the selected container or directs the machine to pick or present recommend the selected container for packing the item.

21. The storage medium of claim 20, wherein the item is one of a plurality of items to be shipped together in the selected container.

22. The storage medium of claim 20, wherein said excluding comprises:

determining whether the item should be designated as needing special damage protection, dependent on the data representing the feedback; and in response to determining that the item should be designated as needing special damage protection, excluding from consideration one or more containers that are unsuitable for shipping items needing special damage protection.

23. The storage medium of claim 22, wherein when executed on the one or more computers, the program instructions further cause the one or more computers to perform:

storing an indication that the item is designated as needing special damage protection in association with the identifier of the item.

24. The storage medium of claim 23, wherein when executed on the one or more computers, the program instructions further cause the one or more computers to perform:

storing an indication that an item that is similar to the item is designated as needing special damage protection.

25. The storage medium of claim 20, wherein at least one of said determining or said excluding is further dependent on one or more of: a weight of the item, a customer to whom the item is to be shipped, a service level agreement, a destination of the item, a shipping carrier selected for shipping the item, item affinity information, an indicator of a fragility of the item, or an environmental constraint.

26. The storage medium of claim 20, wherein the feedback comprises one or more of: a customer rating of the suitability of a container in which the item was shipped, or a customer rating of the condition of the item when it was received.

27. The storage medium of claim 20, wherein the feedback comprises one or more of: a customer experience penalty, a lost opportunity cost, an indication of a concession incident, or a cost associated with a concession incident.

* * * * *